United States Patent
Yu et al.

(10) Patent No.: US 11,025,840 B2
(45) Date of Patent: Jun. 1, 2021

(54) IMAGE SENSOR AND METHOD FOR EXTRACTING EDGE OF IMAGE BASED ON AMPLITUDES OF SIGNALS OUTPUT FROM PIXELS

(71) Applicant: Electronics and Telecommunications Research Institute, Daejeon (KR)

(72) Inventors: Hyun Kyu Yu, Daejeon (KR); Sung Weon Kang, Daejeon (KR); Young-Su Kwon, Daejeon (KR); Joo Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 163 days.

(21) Appl. No.: 16/356,788

(22) Filed: Mar. 18, 2019

(65) Prior Publication Data

US 2019/0289229 A1    Sep. 19, 2019

(30) Foreign Application Priority Data

Mar. 19, 2018    (KR) .................. 10-2018-0031594

(51) Int. Cl.
*H04N 5/341*    (2011.01)
*G06T 7/246*    (2017.01)
(Continued)

(52) U.S. Cl.
CPC .......... *H04N 5/341* (2013.01); *G06K 9/4604* (2013.01); *G06T 7/13* (2017.01); *G06T 7/248* (2017.01)

(58) Field of Classification Search
CPC ... G06T 2207/20192; G06T 7/13; G06T 7/12; H04N 5/142; H04N 1/409
See application file for complete search history.

(56) References Cited

U.S. PATENT DOCUMENTS 5,416,855 A * 5/1995 Geiger .................. G06T 9/20
                                                    358/447
5,805,304 A * 9/1998 Sekine .................. G06K 15/02
                                                    358/1.2
(Continued)

FOREIGN PATENT DOCUMENTS

KR    10-0901354 B1    6/2009
KR    10-1087345 B1    11/2011
(Continued)

OTHER PUBLICATIONS

Rainer Lienhart et al., "An Extended Set of Haar-like Features for Rapid Object Detection", IEEE ICIP, pp. 900-903, 2002.
(Continued)

*Primary Examiner* — Dung Hong
(74) *Attorney, Agent, or Firm* — Rabin & Berdo, P.C.

(57) ABSTRACT

Provided is an image sensor. The image sensor includes a pixel array including pixels arranged along a first direction and a second direction, and partitioned into blocks, a converter configured to convert image signals outputted from the pixels into digital signals based on an image, and an image signal processor configured to add amplitudes of the digital signals belonging to each of the blocks to determine edge blocks among the blocks, compare the amplitudes of the digital signals to determine directions in which direction lines of the edge blocks are directed, and connect the direction lines to extract an edge of the image.

18 Claims, 28 Drawing Sheets

(51) Int. Cl.
  *G06T 7/13* (2017.01)
  *G06K 9/46* (2006.01)

(56) References Cited

U.S. PATENT DOCUMENTS

| | | | |
|---|---|---|---|
| 6,507,364 B1* | 1/2003 | Bishay | G06T 3/4007 |
| | | | 348/242 |
| 7,142,224 B2* | 11/2006 | Funakubo | G06T 11/203 |
| | | | 345/611 |
| 7,496,231 B2 | 2/2009 | Jung | |
| 7,660,455 B2* | 2/2010 | Yamamoto | G06K 9/6206 |
| | | | 382/141 |
| 7,961,357 B2 | 6/2011 | Kim et al. | |
| 7,983,446 B2* | 7/2011 | Wiedemann | G06K 9/0063 |
| | | | 382/103 |
| 8,189,947 B2 | 5/2012 | Lee | |
| 8,811,750 B2 | 8/2014 | Chang et al. | |
| 9,160,896 B1 | 10/2015 | Prokop | |
| 9,355,335 B2 | 5/2016 | Suh et al. | |
| 9,697,434 B2* | 7/2017 | Emery | G06K 9/4609 |
| 2012/0257821 A1* | 10/2012 | Saito | H04N 9/04555 |
| | | | 382/162 |
| 2016/0171710 A1* | 6/2016 | Emery | G06K 9/4609 |
| | | | 382/199 |
| 2017/0372481 A1* | 12/2017 | Onuki | G06T 7/00 |
| 2019/0266741 A1* | 8/2019 | Uehara | G06T 7/12 |

FOREIGN PATENT DOCUMENTS

| | | |
|---|---|---|
| KR | 10-1180387 B1 | 9/2012 |
| KR | 10-1318812 B1 | 10/2013 |

OTHER PUBLICATIONS

Nikola Katic et al., "A Retina-Inspired Robust On-Focal-Plane Multi-Band Edge-Detection Scheme for CMOS Image Sensors", IEEE, pp. 683-686, 2014.

Kyeongryeol Bong et al., "An 1.61 mW Mixed-signal Column Processor for BRISK Feature Extraction in CMOS Image Sensor", IEEE, pp. 57-60, 2014.

* cited by examiner

FIG. 19
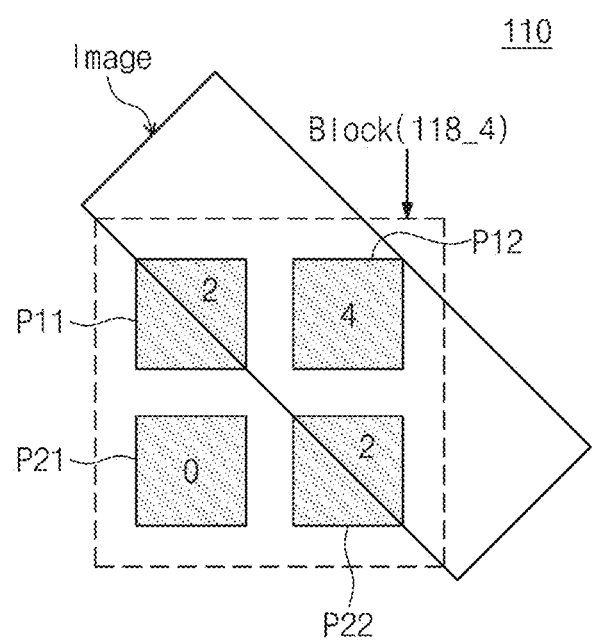
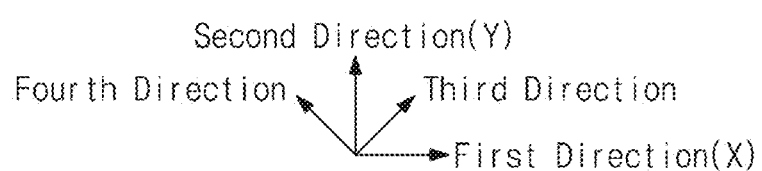

IMAGE SENSOR AND METHOD FOR EXTRACTING EDGE OF IMAGE BASED ON AMPLITUDES OF SIGNALS OUTPUT FROM PIXELS

CROSS-REFERENCE TO RELATED APPLICATIONS

This U.S. non-provisional patent application claims priority under 35 U.S.C. § 119 of Korean Patent Application No. 10-2018-0031594, filed on Mar. 19, 2018, the entire contents of which are hereby incorporated by reference.

BACKGROUND

The present disclosure herein relates to an image sensor and method, and more particularly, to an image sensor and method for extracting an edge of an image based on amplitudes of signals output from pixels.

With recent advances in technology, image sensors may be used for pattern recognition techniques used in autonomous navigation, face recognition, security cameras, factory automation, medical diagnostics, and the like. In addition, the image sensor may be used to recognize not only a pattern but also various subjects such as a user's input, a gesture, a face, a thing, and the like.

The image sensor may include a Charge Coupled Device (CCD) and a CMOS Image Sensor (CIS). For low power and high integration, CIS may be mainly used rather than CCD. The image sensor may receive optical signals from the subject and output electrical signals. In order to recognize the subject, the edge noise of the image may be removed or the edge of the image may be emphasized. Therefore, there is a need for an image sensor capable of extracting an edge of an image using electrical signals.

SUMMARY

The present disclosure is to provide an image sensor and method for extracting an edge of an image based on amplitudes of signals outputted from pixels.

An embodiment of the inventive concept provides an image sensor including: a pixel array including pixels arranged along a first direction and a second direction, and partitioned into blocks; a converter configured to convert image signals outputted from the pixels into digital signals based on an image; and an image signal processor configured to add amplitudes of the digital signals belonging to each of the blocks to determine edge blocks among the blocks, compare the amplitudes of the digital signals to determine directions in which direction lines of the edge blocks are directed, and connect the direction lines to extract an edge of the image.

In an embodiment of the inventive concept, an operation method of an image sensor with a pixel array including pixels arranged along a first direction and a second direction, and partitioned into blocks, a converter configured to convert image signals outputted from the pixel array into digital signals based on an image, and a memory includes: storing, by an image signal processor, addresses of blocks partitioning the pixel array in the memory; determining, by the image signal processor, edge blocks among the blocks by adding amplitudes of the digital signals; comparing, by the image signal processor, the amplitudes of the digital signals to determine directions in which the direction lines of the edge blocks are directed; and connecting, by the image signal processor, the direction lines to extract an edge of the image.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 19 exemplarily shows an edge block in which the sum of the amplitudes of the direction signals of the upper pixels is greater than the sum of the amplitudes of the direction signals of the lower pixels and the amplitude of the direction signal of the right pixel is larger than the amplitude of the direction signal of the left pixel;

DETAILED DESCRIPTION

In the following, embodiments of the inventive concept will be described in detail so that those skilled in the art easily carry out the inventive concept.

Figure 1:
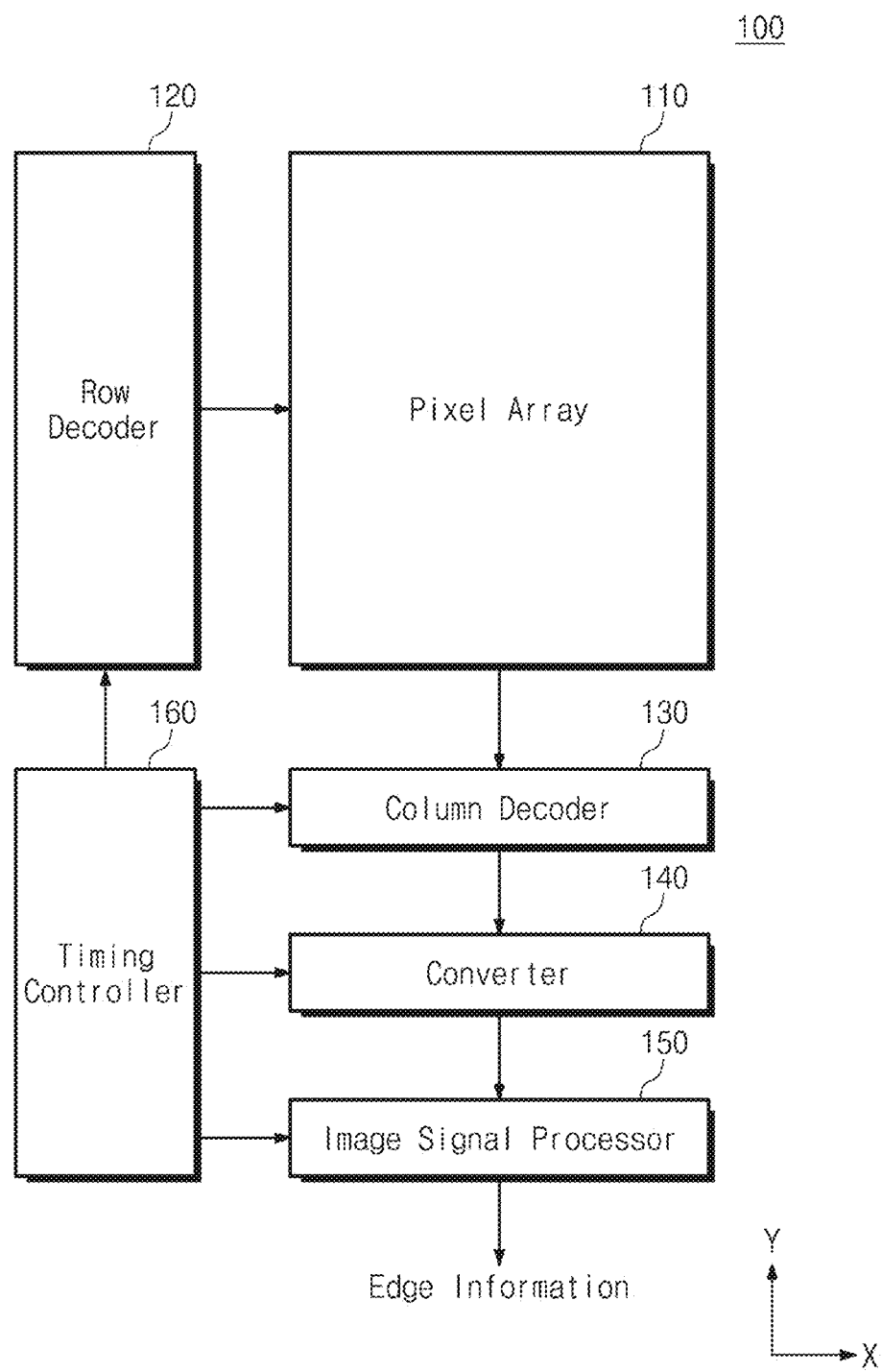
FIG. 1 is a block diagram exemplarily illustrating an image sensor according to an embodiment of the inventive concept.

FIG. 1 is a block diagram exemplarily illustrating an image sensor according to an embodiment of the inventive concept. The image sensor 100 may include a pixel array 110, a row decoder 120, a column decoder 130, a converter 140, an image signal processor 150, and a timing controller 160.

The pixel array 110 may include pixels (not shown) arranged along the X and Y axes. The pixels may be arranged in a two-dimensional matrix form. The pixels may receive optical signals from a subject (or object) through a lens (not shown) and a filter (not shown). The pixels may generate electrical image signals corresponding to the intensities of the optical signals. For example, each of the pixels may include a photodiode and at least one transistor. The physical size of one pixel may represent image resolution or may correspond to a minimum line width of the image.

The row decoder 120 may receive a row address, a timing signal, a control signal, etc. of the pixel array 110 from the timing controller 160. The row decoder 120 may generate at least one driving signal for controlling the pixel array 110 in row units. For example, the row decoder 120 may sequentially drive the rows of the pixel array 110 under the control of the timing controller 160.

The column decoder 130 may receive a timing signal, a control signal, and the like from the timing controller 160. The column decoder 130 may detect the image signals generated in the pixels of the pixel array 110 connected to the row selected by the row decoder 120 through the columns. The column decoder 130 may provide the image signals of the pixel array 110 to the converter 140 based on the control of the timing controller 160.

The converter 140 may receive the image signals from the column decoder 130 and convert the image signals to digital signals. For example, the converter 140 may be an analog-to-digital converter (ADC) and may include an amplifier, a comparator, a logic gate, a flip flop, and the like. The converter 140 may provide the converted digital signals to the image signal processor 150.

An image signal processor (ISP) 150 may receive and process the digital signals. For example, the image signal processor 150 may be a digital signal processor (DSP) used for image processing in mobile devices such as digital cameras, smart phones, or the like or other electronic devices. The image signal processor 150 according to the embodiment of the inventive concept may extract the edge of the image as well as the original information of the image and may output the edge information of the image. For example, the image signal processor 150 may be referred to as an edge signal processor ESP.

The timing controller 160 may generate timing signals and control signals for the row decoder 120, the column decoder 130, the converter 140, and the image signal processor 150. The timing controller 160 may control an operation sequence, operation timings, and the like of the row decoder 120, the column decoder 130, the converter 140, and the image signal processor 150.

In an embodiment, all or a part of the pixel array 110, the row decoder 120, the column decoder 130, the converter 140, the image signal processor 150, and the timing controller 160 may be integrated into one semiconductor chip (e.g., A system on chip (SoC), an application specific integrated circuit (ASIC), etc.), or a semiconductor package. Alternatively, each of the pixel array 110, the row decoder 120, the column decoder 130, the converter 140, the image signal processor 150, and the timing controller 160 may be independently fabricated on a plurality of semiconductor chips.

Figure 2:
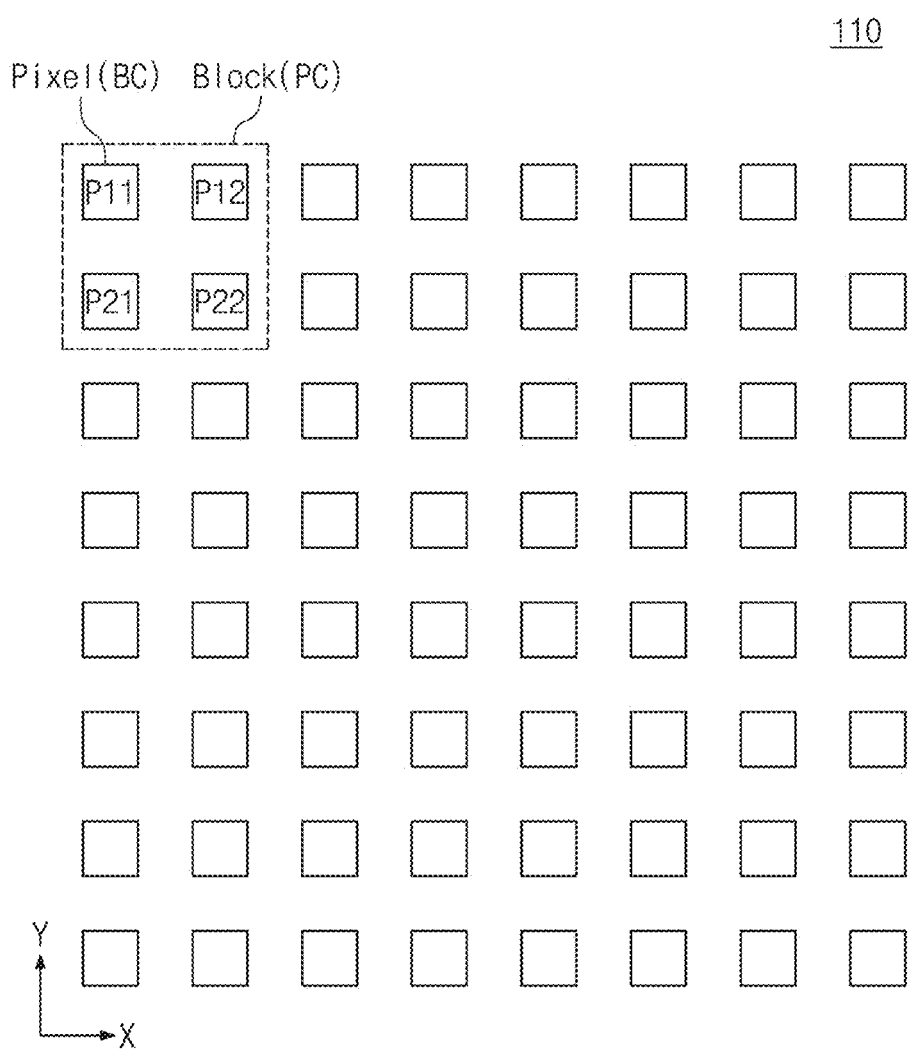
FIG. 2 shows the pixel array of FIG. 1 in more detail.

FIG. 2 shows the pixel array of FIG. 1 in more detail. FIG. 2 will be described with reference to FIG. 1. Referring to FIG. 2, 2×2 pixels P11, P12, P21, and P22 which are adjacent (contiguous) may be allocated to one block having a square shape. Here, a pixel may be referred to as a basic cell (BC) and a block may be referred to as a primitive cell (PC). And, the numbers in the pixels P11, P12, P21, and P22 may indicate relative coordinates on the X and Y axes.

According to an embodiment of the inventive concept, the pixel array 110 may be partitioned into blocks. The size of the block may be m×n pixels. Herein, m may represent the number of pixels arranged along the X axis in one block and n may represent the number of pixels arranged along the Y axis in one block. m and n are integers of 2 or more and may be the same or different from each other.

The image signal processor 150 may extract an edge of an image in block units. The image signal processor 150 may preset the block size based on the user's request, image resolution, edge precision, edge extraction speed, and the like. The image signal processor 150 may configure the blocks through address selection of the pixel array 110 without additional hardware components associated with the pixel array 110. The image signal processor 150 may extract the edges of the image based on the amplitudes (magnitudes) of the digital signals obtained by converting the image signals outputted from the 2×2 pixels P11, P12, P21, and P22 of each of the blocks using the converter 140.

Figure 3:
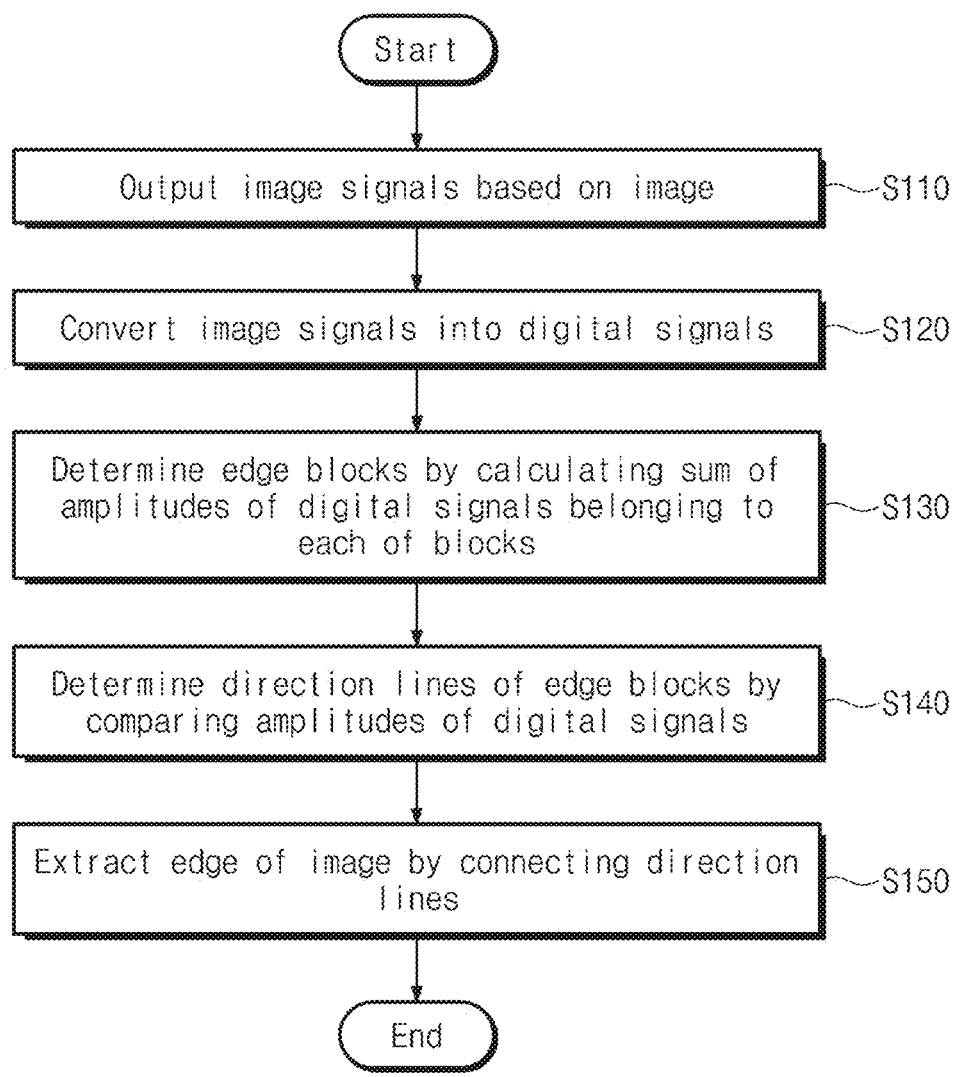
FIG. 3 is a flowchart illustrating an exemplary method of extracting an edge of an image according to an embodiment of the inventive concept.

FIG. 3 is a flowchart illustrating an exemplary method of extracting an edge of an image according to an embodiment of the inventive concept. FIG. 3 will be described with reference to FIGS. 1 and 2.

In operation S110, the pixel array 110 may output image signals based on the image. The image signals may be analog signals, and the amplitudes of the image signals may correspond to the intensities of the optical signals incident from the subject.

In operation S120, the converter 140 may convert the image signals (analog signals) transmitted from the pixel array 110 into digital signals. For example, the converter 140 may quantize the amplitudes of the image signals to k bits.

In this case, the amplitudes of the image signals may be quantized in $2^k$ operations. Herein, k may be determined based on the speed, area, power consumption, accuracy, etc. of the converter 140. As k is larger, the area and power consumption of the converter 140 may be larger, but the accuracy may also be increased.

In operation 130, the image signal processor 150 may add digital signals belonging to each of the blocks of the pixel array 110. For example, the image signal processor 150 may include an adder, a counter, etc. for addition operations. The image signal processor 150 may determine the edge blocks among the blocks by calculating the sum of the amplitudes of the digital signals belonging to each of the blocks. The edge of the image (or the edge of the subject on the pixel array 110) may be located in edge blocks.

In operation S140, the image signal processor 150 compares the amplitudes of the digital signals and may determine the directions in which the direction lines of the edge blocks are directed. The image signal processor 150 may determine the direction line of the edge block as a horizontal line parallel to the X axis, a vertical line parallel to the Y axis, or an inclined line (grade line or slope) between the horizontal line and the vertical line. Herein, the angle between the inclined line and the horizontal line may be greater than 0° and less than 180°. The number of inclined lines determined by the image signal processor 150 may be at least one.

In operation S150, the image signal processor 150 may extract the edges of the image by connecting the direction lines of the edge blocks. The image signal processor 150 may output the extracted edge information to the outside of the image sensor 100.

Figure 4:
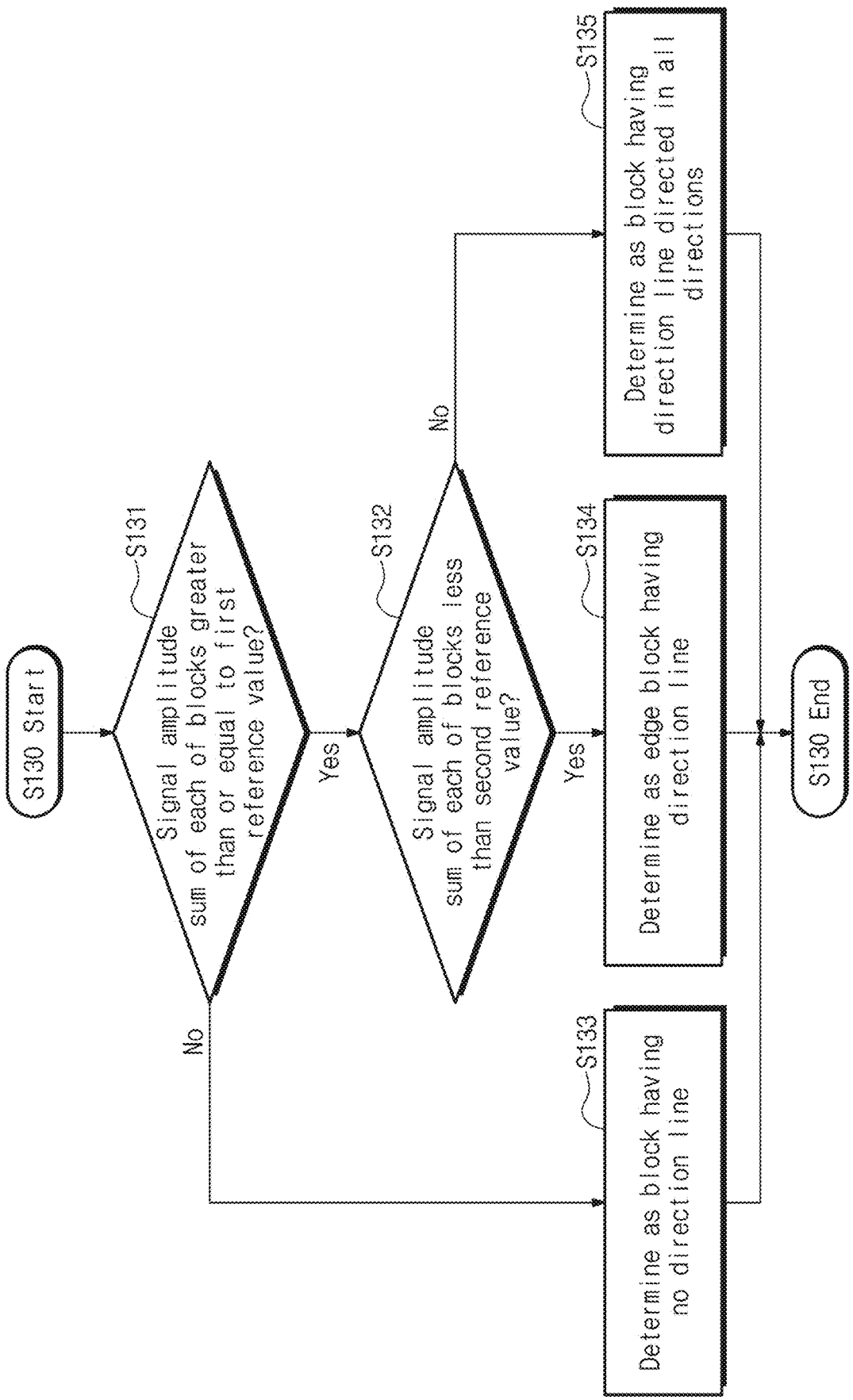
FIG. 4 is a flowchart illustrating an example of detailed operations of operation S130 of FIG. 3.

FIG. 4 is a flowchart illustrating an example of detailed operations of operation S130 of FIG. 3. FIG. 4 will be described with reference to FIGS. 1 to 3.

In operation S131, the image signal processor 150 may determine whether the sum of the amplitudes of the digital signals belonging to each of the blocks is greater (higher) than or equal to a first reference value. For example, the image signal processor 150 may include a comparator and at least one register that stores a sum of the amplitudes of the digital signals belonging to each of the blocks and a first reference value. At least one of the register may be included in a memory device (e.g., cache memory, main memory, etc.) located outside the image signal processor 150. The first reference value may be preset by the image signal processor 150. If the sum of the amplitudes of the digital signals belonging to each of the blocks is equal to or larger than the first reference value, operation S132 is performed. If not, operation S134 proceeds.

In operation S132, the image signal processor 150 may determine whether the sum of the amplitudes of the digital signals belonging to each of the blocks is less (lower) than a second reference value. For example, the image signal processor 150 may further include a register for storing the second reference value. The second reference value may be preset by the image signal processor 150. If the sum of the amplitudes of the digital signals belonging to each of the blocks is less than the second reference value, operation S134 is performed. If not, operation S135 proceeds.

In operation S133, the image signal processor 150 may determine that the blocks whose sum of the amplitudes of the digital signals is less than the first reference value do not have direction lines. That is, the image signal processor 150 may not determine the direction lines of the blocks in operation S133. Even if the image is not located in the blocks in operation S133 or the edge of the image is located in the blocks in operation S133, the amplitudes of the image signals generated in the blocks may be very small. Thus, the image signal processor 150 may set the first reference value based on the accuracy of edge extraction of the image.

In operation S134, the image signal processor 150 may determine the blocks whose sum of the amplitudes of the digital signals is greater than or equal to the first reference value and is less than the second reference value as the edge blocks. That is, the image signal processor 150 may determine the directions in which the direction lines of the blocks in operation S134 are directed. The edges of the image may be located in the blocks in operation S134. The amplitudes of the image signals generated in any block where the edge of the image is located may be less than the amplitudes of the image signals generated in other blocks located within the edge of the image. Thus, the image signal processor 150 may set the second reference value based on the accuracy of edge extraction of the image.

In operation S135, the image signal processor 150 may determine that the blocks whose sum of the amplitudes of the digital signals is greater than or equal to the second reference value have direction lines that may be directed in all directions. The blocks in operation S135 may be omni-directional blocks. The image signal processor 150 may determine the directions in which the direction lines of the blocks in operation S135 are directed based on the sum of the amplitudes of the digital signals of the blocks adjacent to each of the blocks in operation S135. Alternatively, the image signal processor 150 may determine that the blocks in operation S135 are located within the edge of the image and may not determine the direction lines of the blocks in operation S135.

In an embodiment, if there are edge blocks in operation S134 among the blocks adjacent to the arbitrary first block in operation S135, the image signal processor 150 may determine the direction in which the direction line of the first block is directed based on the direction lines of the edge blocks in operation S134. In this case, the first block may be an edge block. The image signal processor 150 may determine the direction in which the direction line of the first block is directed, for connecting the direction lines of the blocks in operation S134.

In another embodiment, if the sum of the amplitudes of the digital signals of all the blocks adjacent to the arbitrary second block in operation S135 (i.e., all the blocks surrounding the second block) is greater than or equal to the second reference value, the image signal processor 150 may not determine the direction in which the direction line of the second block is directed. In this case, the second block may not be located at the edge of the image, but may be located on the surface within the edge of the image. That is, the second block may not be an edge block.

In summary, the image signal processor 150 may not determine the direction line of the block corresponding to Equation 1. The image signal processor 150 may determine the direction in which the direction line of the block corresponding to Equation 2 is directed. The image signal processor 150 may determine that the direction line of the block corresponding to Equation 3 may be directed in all directions. Equations 1 to 3 are as follows. In Equations 1 to 3, B may represent a block, i and j may represent relative coordinate values on the Y and X axes, and n may be determined based on the size of the block.

$$\sum_{i,j=1}^{n} |Bij| < \text{(Reference value 1)} \quad \text{[Equation 1]}$$

$$\text{(Reference value 1)} \leq \sum_{i,j=1}^{n} |Bij| < \text{(Reference value 2)} \quad \text{[Equation 2]}$$

$$\text{(Reference value 2)} \leq \sum_{i,j=1}^{n} |Bij| \quad \text{[Equation 3]}$$

Figure 5:
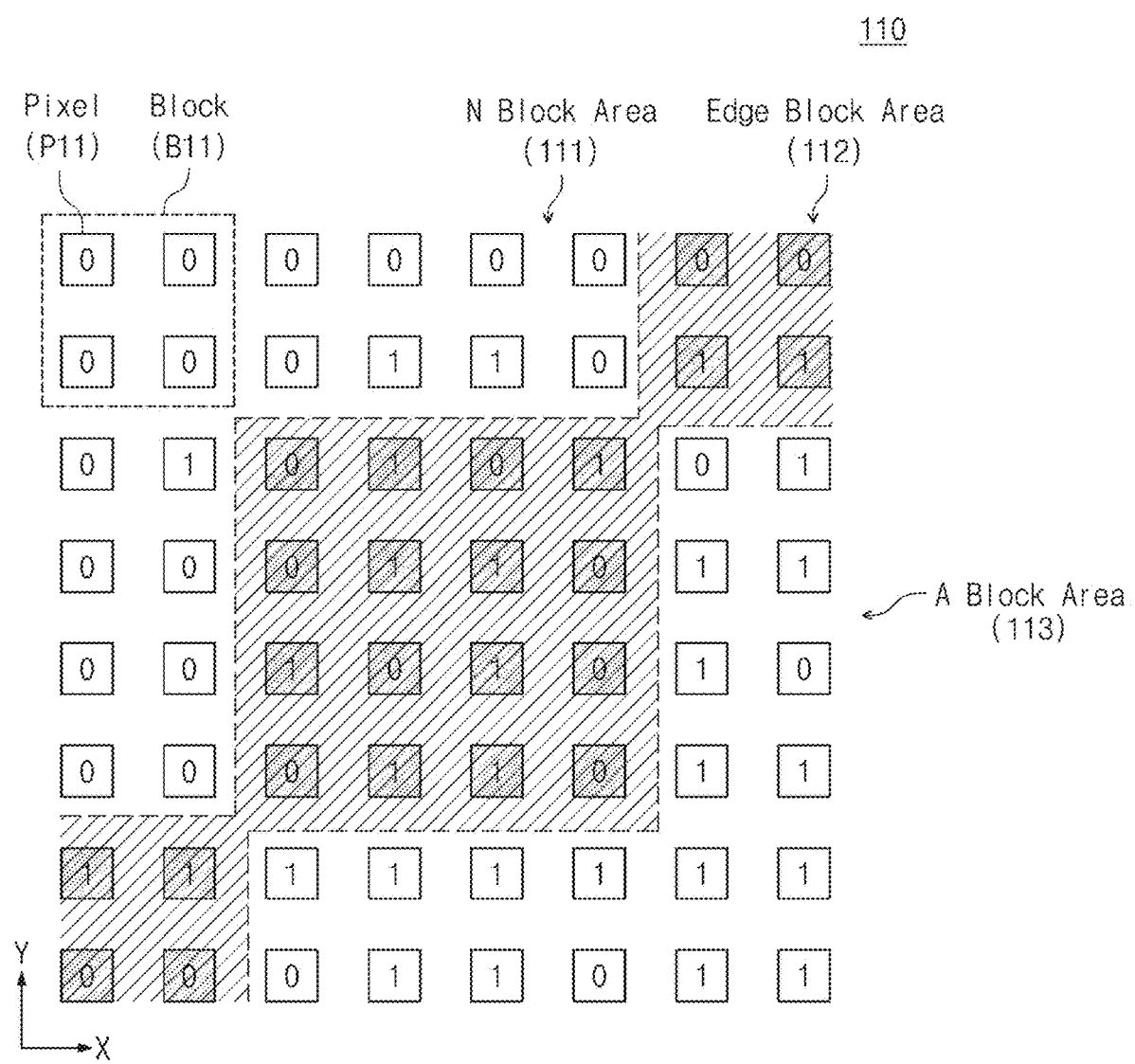
FIG. 5 illustrates an example in which an image signal processor determines blocks that partition a pixel array according to operation S130 of FIG. 3, including operations S131 to S135 of FIG. 4.

FIG. 5 illustrates an example in which an image signal processor determines blocks that partition a pixel array according to operation S130 of FIG. 3, including operations S131 to S135 of FIG. 4. FIG. 5 will be described with reference to FIGS. 1 to 4.

In FIG. 5, it is assumed that the converter 140 converts the image signals output from the pixels of the pixel array 110 into 1-bit digital signals (for example, the above-described k is 1). The minimum and maximum values of the digital signal may be "0" and "1", respectively. It is assumed that the block contains 2×2 pixels. In this assumption, the minimum and maximum values of the sum of the amplitudes of the digital signals of one block may be "0" and "4".

In an embodiment, the image signal processor 150 may divide the blocks partitioning the pixel array 110 into an N block area 111, an edge block area 112, and an A block area 113 based on the sum of the amplitudes of the digital signals belonging to the block. In the N block region 111, blocks whose sum of the amplitudes of the digital signals is less than the first reference value may be located. Here, N is an abbreviation of "Null". The image signal processor 150 may not determine the direction lines of the blocks located in the N block area 111 (see operation S133 of FIG. 4). In the edge block area 112, edge blocks whose sum of amplitudes of the digital signals is greater than or equal to the first reference value and is less than the second reference value may be located. The image signal processor 150 may determine the directions in which the direction lines of the blocks located in the edge block area 112 is directed (refer to operation S134 of FIG. 4). In the A block area 113, blocks whose sum of amplitudes of digital signals is greater than or equal to the second reference value may be located. Here, A is an abbreviation of "All". The image signal processor 150 may determine that the direction lines of the blocks located in the edge block area 113 may be directed in all directions (refer to operation S135 of FIG. 4).

For example, the image signal processor 150 may set the first reference value to 50% of the maximum value of the sum of the amplitudes of the digital signals of the block. The image signal processor 150 may set the second reference value to 75% of the maximum value of the sum of the amplitudes of the digital signals of the block. According to the above assumption, since the maximum value of the sum of the amplitudes of the digital signals of one block is 4, the first reference value may be 2 and the second reference value may be 3. The above-described numerical values are all exemplary.

Referring to FIG. 5, blocks whose sum of the amplitudes of digital signals is 0 or 1 may be located in the N block area 111. Blocks whose sum of the amplitudes of digital signals is 2 may be located in the edge block area 112. Blocks whose sum of the amplitudes of digital signals is 3 or 4 may be located in the A block area 113.

In the description of FIG. 5, it is assumed that the converter 140 converts the image signals output from the pixels of the pixel array 110 into 1-bit digital signals. The converter 140 may convert the image signals into digital signals of bits other than one bit. For example, the converter 140 may convert image signals to 3-bit digital signals, and the image signal may be quantized in 8 operations. According to an embodiment of the inventive concept, the image signal processor 150 may allocate codes of 0, 1, 2, 3, and 4 to the digital signals quantized in 8 operations. Specific examples of code allocation are described with reference to Table 1.

TABLE 1

| Amplitude of 3-bit digital signal | Signal amplitude [%] | Code allocation | Error [%] |
|---|---|---|---|
| 000 | 0 | 0 | 0 |
| 001 | 14 | 1 | 11 |
| 010 | 28 | 1 | 3 |
| 011 | 43 | 2 | 7 |
| 100 | 57 | 2 | 7 |
| 101 | 71 | 3 | 4 |
| 110 | 86 | 3 | 11 |
| 111 | 100 | 4 | 0 |

In Table 1, 5 codes of 5 operations may be allocated to the amplitude of a 3-bit digital signal quantized in 000 to 111. Since codes of 5 operations are allocated to the digital signals quantized in 8 operations, an error may exist. In an embodiment, if the image signal processor 150 uses a 3-bit digital signal quantized in 000 to 111 as is, there may be no error in Table 1. As the number of allocated codes is decrease, the error may increase, but the time required for the image signal processor 150 to extract an edge of the image may be reduced.

In the example of Table 1, the digital signal converted by the converter 140 from one pixel may have an amplitude from 0 to 4. If the block includes 2×2 pixels, the minimum and maximum values of the sum of the amplitudes of the digital signals of the block may be "0" and "16", respectively. In this case, the first reference value may be 8 which is 50% of the maximum value of the sum of the amplitudes of the digital signals of the block, and the second reference value may be 12 which is 75% of the maximum value of the sum of the amplitudes of the digital signals of the block. Hereinafter, a specific example in which the image signal processor 150 determines an edge of an image will be described.

Figure 6:
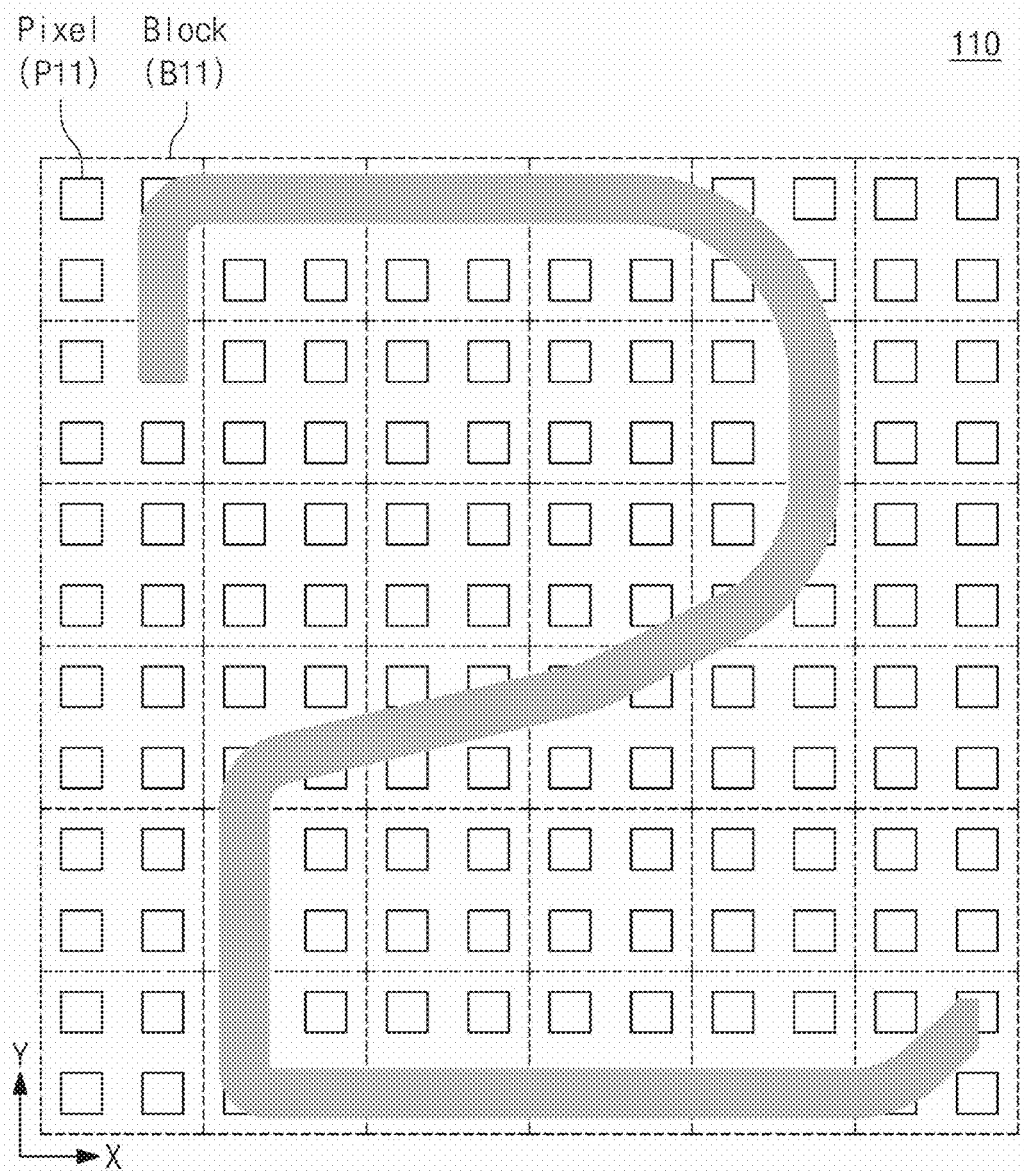
FIGS. 6 to 8 illustrate an example in which an edge of an image is determined according to an embodiment of the inventive concept.
Figure 7:
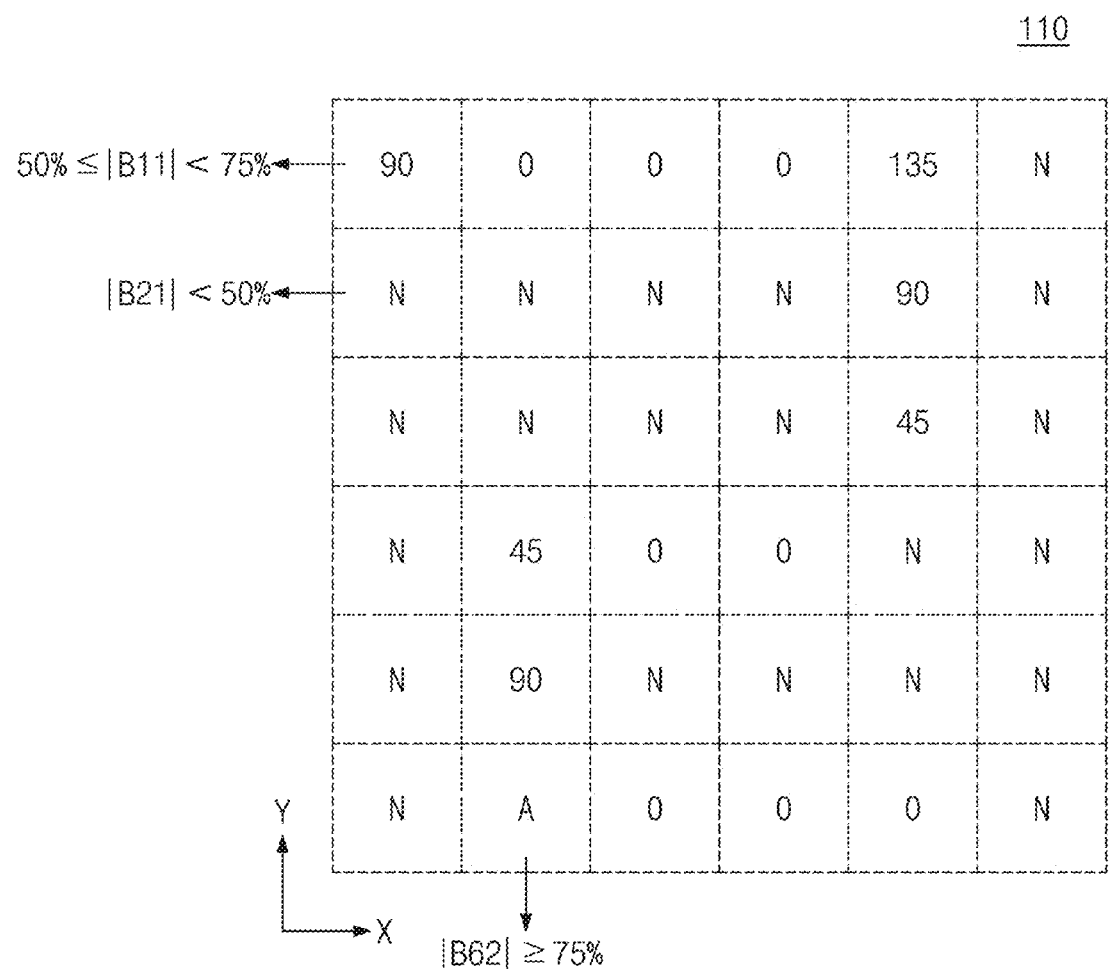
Figure 8:
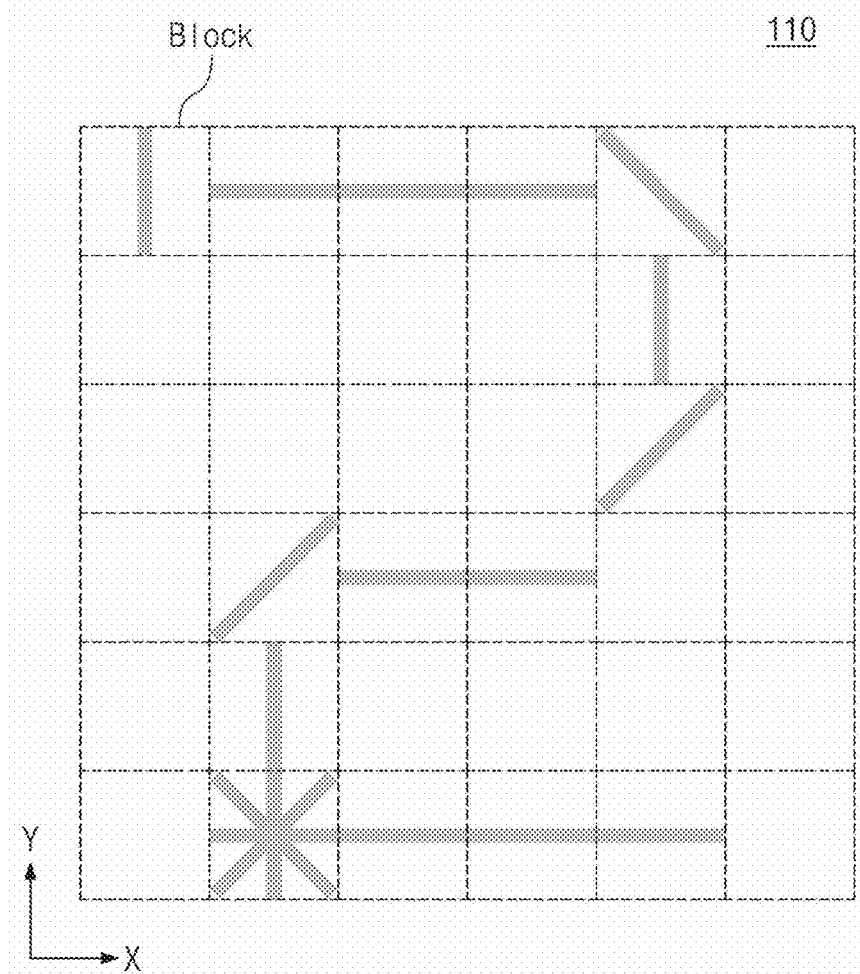

FIGS. 6 to 8 illustrate an example in which an edge of an image is determined according to an embodiment of the inventive concept. FIGS. 6 to 8 will be described together and will be described with reference to FIGS. 1, 3, 4, and 5.

Referring to FIG. 6, the pixel array 110 may include 12×12 pixels arranged along the X and Y axes. The pixel array 110 may be partitioned by 6×6 blocks arranged along the X and Y axes. The sizes of the blocks are equal to each other and each of the blocks may include 2×2 pixels. For example, optical signals based on the image number of "2" may be incident on the pixel array 110.

Referring to FIG. 7, the image signal processor 150 may determine the direction lines of the edge blocks among the 6×6 blocks based on the sum of the amplitudes of the digital signals of each of the 6×6 blocks (refer to operation S130 in FIG. 3). For example, the image signal processor 150 may determine that the direction line of the edge block is directed to any one of 0°, 45°, 90°, and 135° with respect to the X axis. The detailed operations of the image signal processor 150 to determine the direction in which the direction line of the edge block is directed will be described later with reference to FIGS. 10 to 21. Here, the values and the numbers of angles of the direction line that the image signal processor 150 may select are all exemplary.

Each of the 6×6 blocks may output image signals based on the image. For example, each of the sums of the amplitudes of the digital signals of the blocks B16, B21, B22, B23, B24, B26, B31, B32, B33, B34, B36, B41, B45, B46, B51, B53, B54, B55, B56, B61, and B66 among the 6×6 blocks may be less than the first reference value (e.g., 50%). Each of the sums of the amplitudes of the digital signals of the blocks B11, B12, B13, B14, B15, B25, B35, B42, B43, B44, B52, B63, B64, and B65 among the 6×6 blocks may be greater than or equal to the first reference value and may be less than the second reference value (e.g., 75%). The sum of the amplitudes of the digital signals of the block B62 among the 6×6 blocks may be greater than or equal to the second reference value (e.g., 75%).

The image signal processor 150 determines that the blocks B16, B21, B22, B23, B24, B26, B31, B32, B33, B34, B36, B41, B45, B46, B51, B53, B54, B55, B56, B61, and B66 among the 6×6 blocks belong to the N block area 111 of FIG. 5 and does not determine the direction lines of the blocks (refer to operation S133 of FIG. 4). The image signal processor 150 determines that the blocks B11, B12, B13, B14, B15, B25, B35, B42, B43, B44, B52, B63, B64, and B65 among the 6×6 blocks belong to the edge block area 112 of FIG. 5 and respectively determine the direction lines of the blocks (refer to operation S134 of FIG. 4). The image signal processor 150 determines that the block B62 among the 6×6 blocks belongs to the A block area 113 of FIG. 5 and that the direction line of the block may be directed to all directions (refer to operation S135 of FIG. 4).

In the embodiment, the image signal processor 150 may determine the direction in which the direction line of the block B62 is directed based on the direction lines of the other edge blocks B52 and B63 adjacent to the block B62. The image signal processor 150 may determine the direction line of the edge block B52 as 90° and the direction line of the edge block B63 as 0°. Accordingly, the image signal processor 150 may determine the direction line of the block B62 as 135° so as to connect the direction line of the edge block B52 and the direction line of the edge block B63.

FIG. 8 exemplarily shows direction lines of edge blocks among 6×6 blocks determined by the image signal processor 150. For example, the direction line may correspond to any one of 0°, 45°, 90°, and 135° with respect to the X axis. The image signal processor 150 according to the embodiment of the inventive concept may position the direction line so that the direction line passes through the center of the block even if the image is located at a non-center portion in the block. Referring to FIG. 8, the image signal processor 150 may determine and reconstruct the edge of the image number of "2" in FIG. 6.

Figure 9:
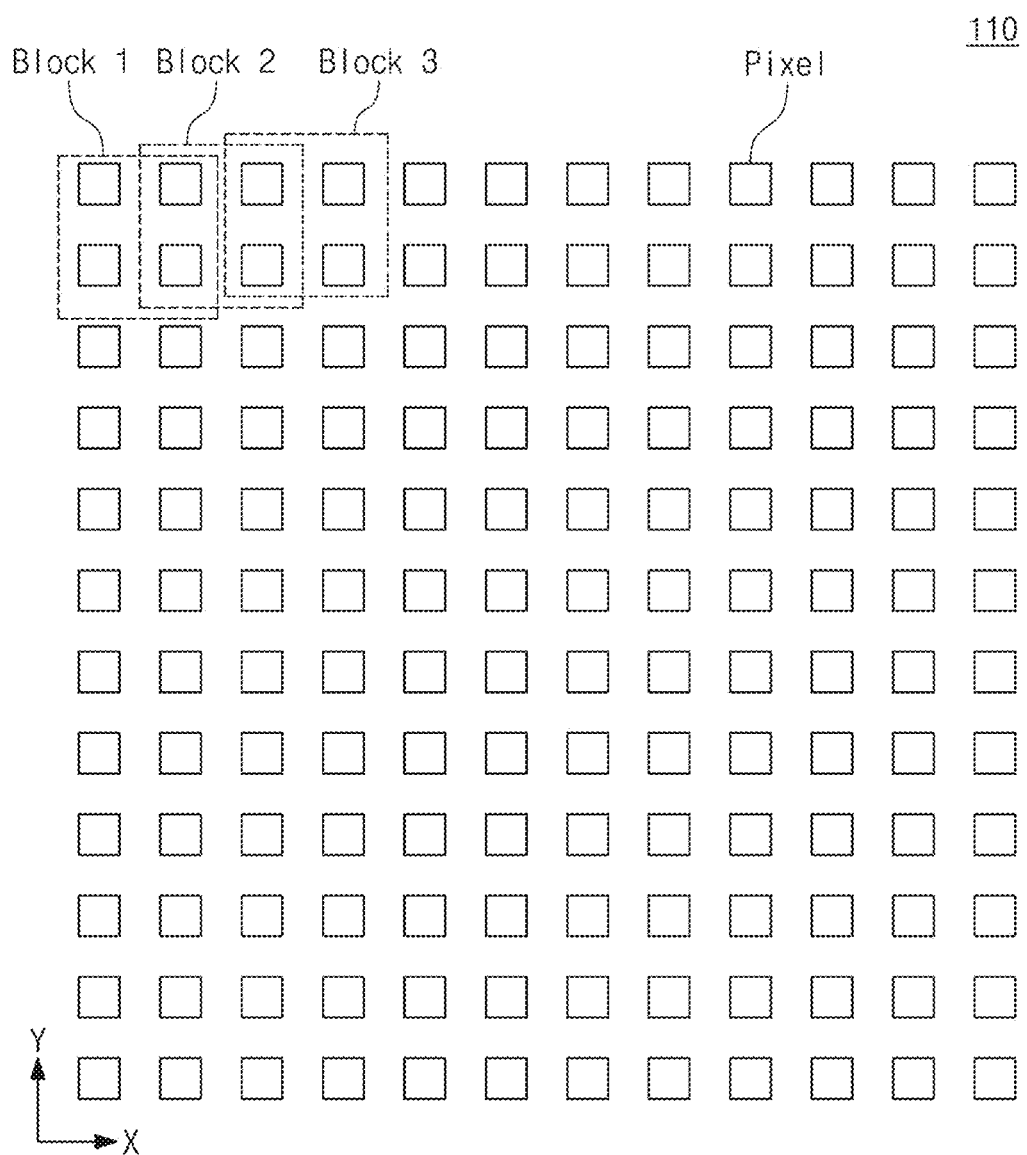
FIG. 9 illustrates an example in which the pixel arrays of FIG. 1 are partitioned into blocks that are overlapped with each other according to an embodiment of the inventive concept.

FIG. 9 illustrates an example in which the pixel arrays of FIG. 1 are partitioned into blocks that overlap each other according to an embodiment of the inventive concept. FIG. 9 will be described with reference to FIGS. 1 and 6 to 8.

Referring to FIGS. 6 to 8, the pixel array 110 may be partitioned by 6×6 blocks that do not overlap with each other. According to an embodiment of the inventive concept, the blocks partitioning the pixel array 110 may overlap each other.

In other words, the blocks may share at least one pixel. Referring to FIG. 9, the pixel array 110 may be partitioned into blocks that each include 2×2 pixels and overlap each other.

The image signal processor 150 may calculate the sum of the amplitudes of the digital signals of each of the blocks overlapping each other and determine the directions in which the direction lines of the edge blocks are directed based on the sum. For example, the image signal processor 150 may respectively determine the direction lines of the first to third blocks located along the X axis according to operation S140 in FIG. 4. The direction line of the second block may be further determined by the image signal processor 150. Therefore, the direction line of the second block is further determined more than when the image signal processor 150 determines only the direction lines of the first and third blocks, so that the edges of the image may be extracted more precisely.

Figure 10:
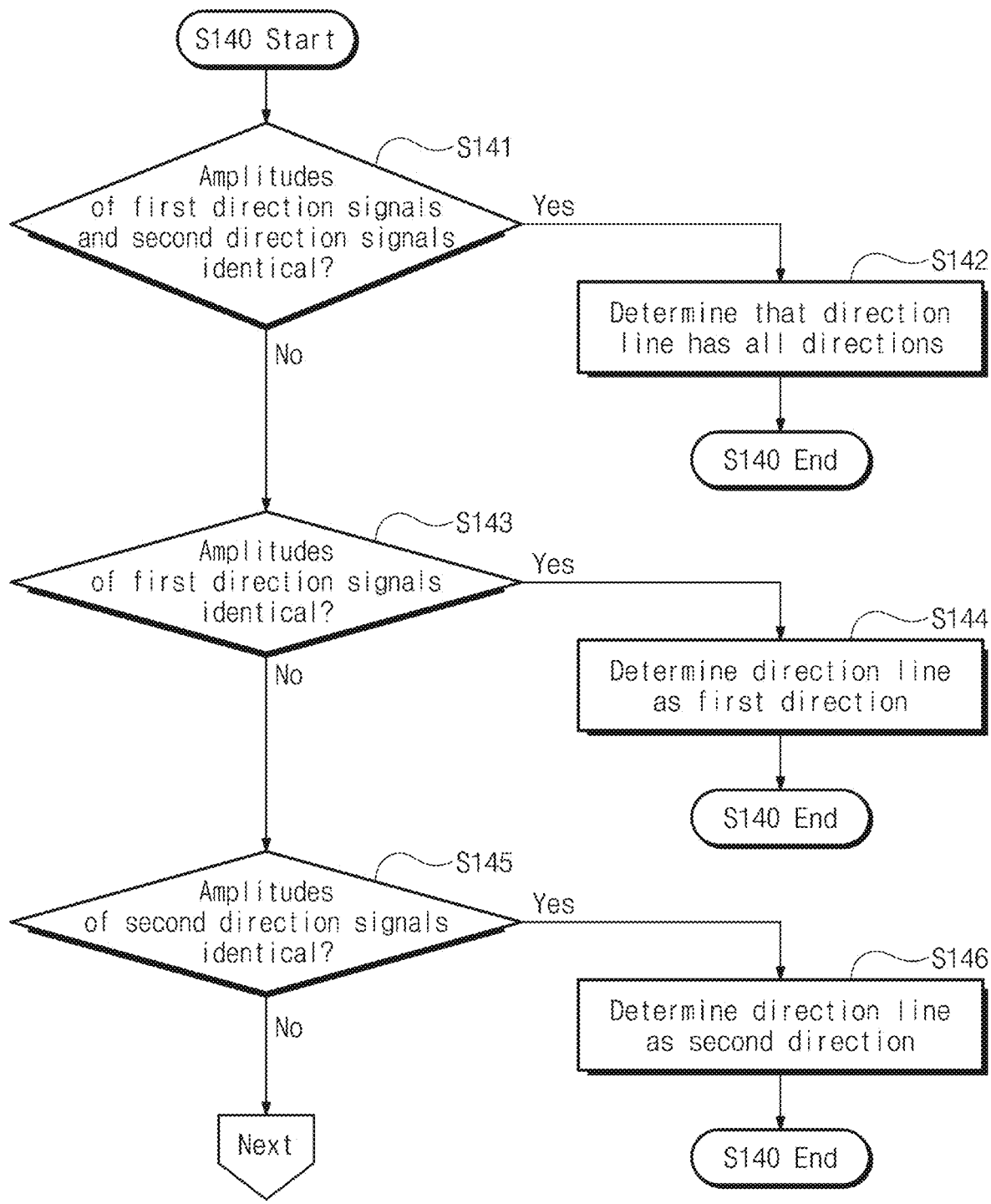
FIG. 10 is a flowchart illustrating an example of detailed operations of operation S140 of FIG. 3.

FIG. 10 is a flowchart illustrating an example of detailed operations of operation S140 of FIG. 3. FIG. 10 will be described with reference to FIGS. 1 to 3. FIG. 10 will be described together with reference to the specific examples shown in FIGS. 11 to 14. In FIG. 10, it is assumed that each of the blocks partitioning the pixel array 110 includes 2×2 pixels P11, P12, P21, and P22. Then, the X-axis direction is the first direction and the Y-axis direction is the second direction. It is assumed that the amplitude of the digital signal converted by the converter 140 from one pixel in FIGS. 11 to 14 is 0 to 4.

In operation S141, the image signal processor 150 may determine whether the amplitudes of the first direction signals and the second direction signals are the same or equal to each other. In operation S141, the image signal processor 150 may perform an operation based on Equation 4.

$$|P11|=|P12|=|P21|=|P22| \quad \text{[Equation 4]}$$

For example, the image signal processor 150 may include at least one register that stores each of the amplitudes of the first direction signals and the second direction signals. If the amplitudes of the first direction signals and the second direction signals are equal to each other, operation S142 may be performed. If not, operation S143 proceeds.

The converter 140 may convert the image signals output from the pixels P11 and P12 arranged in the first direction into the first direction signals. The converter 140 may convert the image signals output from the pixels P21 and P22 arranged in the first direction into the first direction signals. For example, the pixels arranged along the first direction may have the same coordinate value in the second direction.

The converter 140 may convert the image signals output from the pixels P21 and P11 arranged in the second direction into the second direction signals. The converter 140 may convert the image signals output from the pixels P22 and P12 arranged in the second direction into second direction signals. For example, the pixels arranged along the second direction may have the same coordinate value in the first direction.

Figure 11:
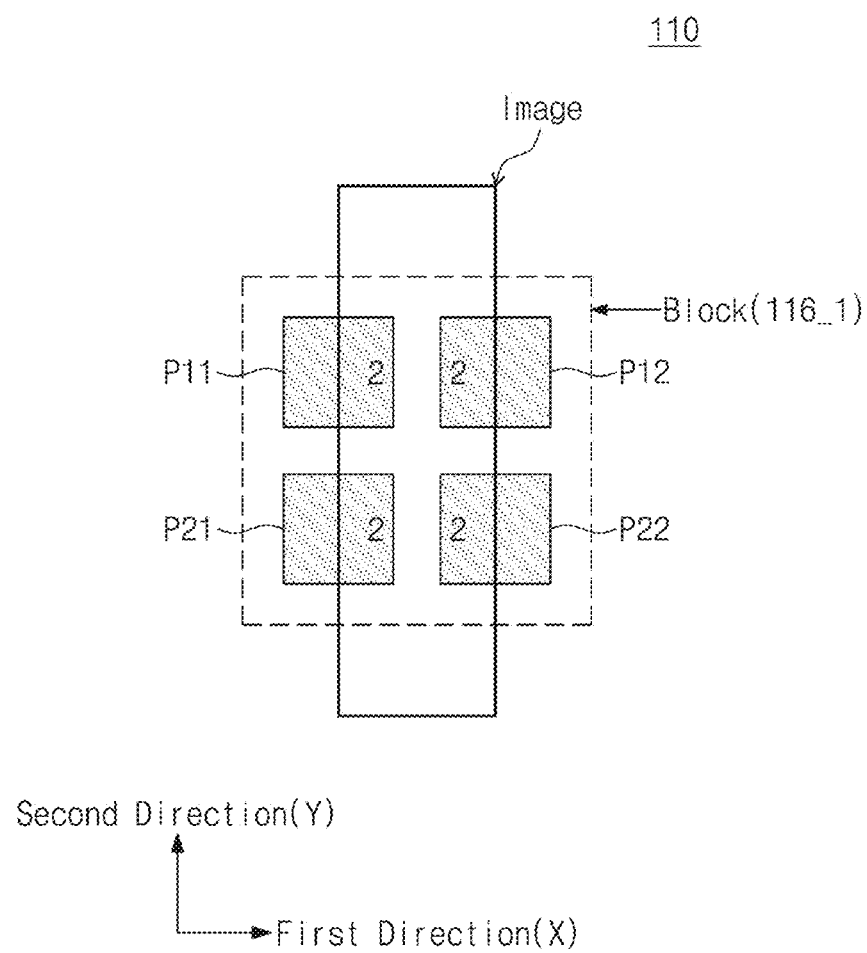
FIGS. 11 and 12 exemplarily illustrate edge blocks having the same amplitudes of the first direction signals and the second direction signals.
Figure 12:
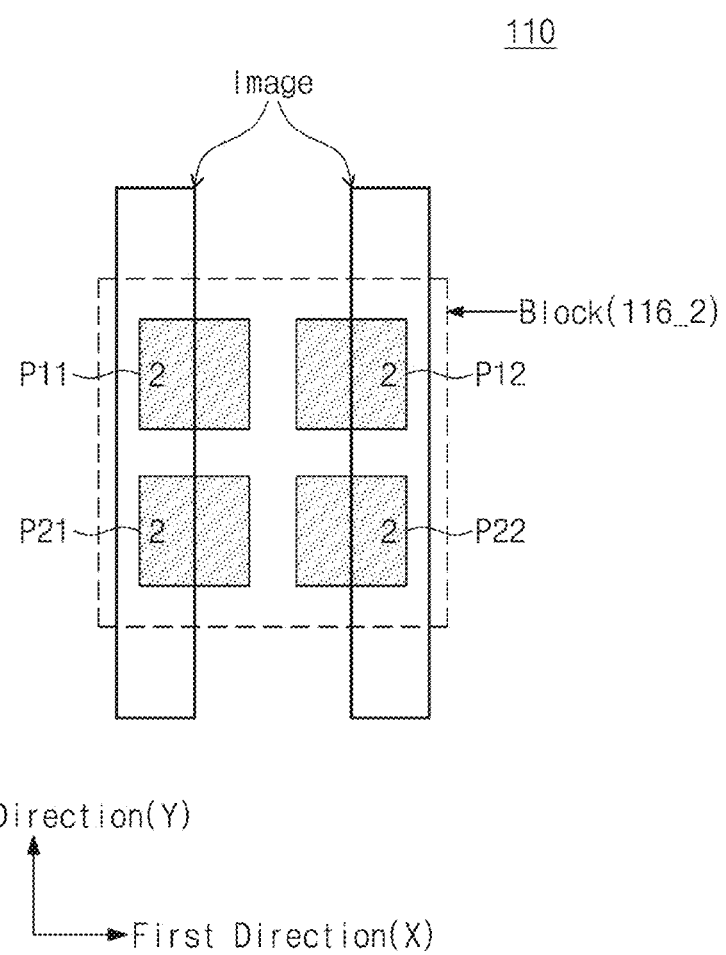

In operation S142, the image signal processor 150 may determine that the direction line is directed in all directions. FIGS. 11 and 12 exemplarily illustrate edge blocks having the same amplitudes of the first direction signals and the second direction signals. Referring to FIG. 11, an image may be uniformly positioned on 2×2 pixels P11, P12, P21, and P22. The image shown in FIG. 11 may be part of any image or may be itself. The amplitude of the digital signal output from each of the 2×2 pixels P11, P12, P21, and P22 and converted by the converter 140 may be, for example, 2. Since the amplitudes of the first direction signals and the second direction signals are 2, the image signal processor 150 may determine that the direction line of the edge block 116_1 may be directed in all directions.

Referring to FIG. 12, an image may be uniformly positioned on 2×2 pixels P11, P12, P21, and P22. The image shown in FIG. 12 may be part of any image or may be itself. Although the image of FIG. 12 differs from the image of FIG. 11, the amplitude of the digital signal output from each of the 2×2 pixels P11, P12, P21, and P22 and converted by the converter 140 may be, for example, 2. Since the amplitudes of the first direction signals and the second direction signals are 2, the image signal processor 150 may determine that the direction line of the edge block 116_2 may be directed in all directions.

In an embodiment, in operation S142, the image signal processor 150 determines that the direction line is directed in all directions and then determines the direction in which the direction line of the block in step S142 is directed based on the direction line of any block adjacent to the block in operation S142.

In operation S143, the image signal processor 150 may determine whether the amplitudes of the first direction signals are equal to each other. In operation S143, the image signal processor 150 may perform an operation based on Equation 5.

$$(|P11|=|P12|) \cap (|P21|=|P22|) \qquad \text{[Equation 5]}$$

If the amplitudes of the first direction signals are equal to each other, operation S144 may be performed. If not, operation S145 proceeds.

Figure 13:
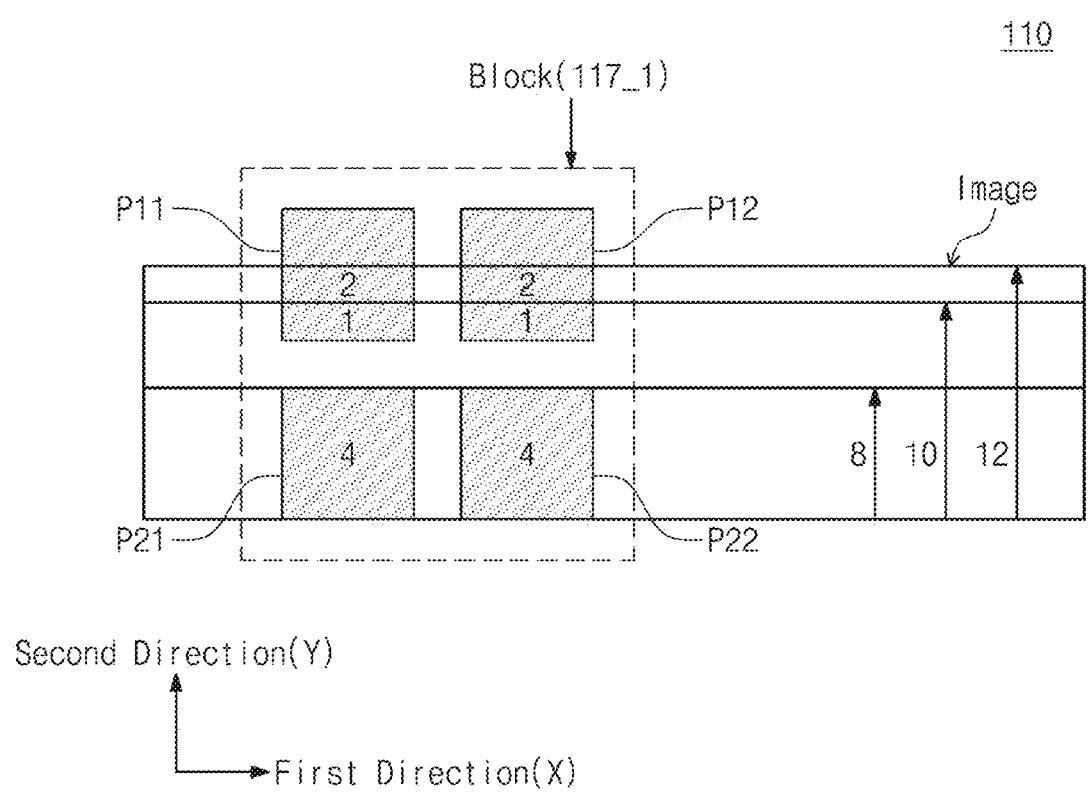
FIG. 13 exemplarily shows edge blocks having the same amplitudes of the first direction signals.

In operation S144, the image signal processor 150 may determine that the direction line of the edge block is directed in the first direction. FIG. 13 exemplarily shows edge blocks having the same amplitudes of the first direction signals. The image may be formed along the first direction. The line width of the image may be varied, for example, 8, 10, 12, and the like, as shown in FIG. 13. Regardless of the line width of the image shown in FIG. 13, the amplitudes of the first direction signals output from the pixels P21 and P22 arranged along the first direction and converted by the converter 140 may be equal to each other as 4. If the line width of the image shown in FIG. 13 is 10, the amplitudes of the first direction signals output from the pixels P11 and P12 arranged along the first direction and converted by the converter 140 may be equal to each other as 1. Similarly, if the line width of the image shown in FIG. 13 is 12, the amplitudes of the first direction signals output from the pixels P11 and P12 arranged along the first direction and converted by the converter 140 may be equal to each other as 2. Accordingly, the image signal processor 150 may determine that the direction line of the edge block 117_1 is directed in the first direction.

In operation S145, the image signal processor 150 may determine whether the amplitudes of the second direction signals are equal to each other. In operation S145, the image signal processor 150 may perform an operation based on Equation 6.

$$(|P11|=|P21|) \cap (|P12|=|P22|) \qquad \text{[Equation 6]}$$

If the amplitudes of the second direction signals are equal to each other, operation S146 may be performed. If not, the next operation (operation S147 of FIG. 15) may proceed.

Figure 14:
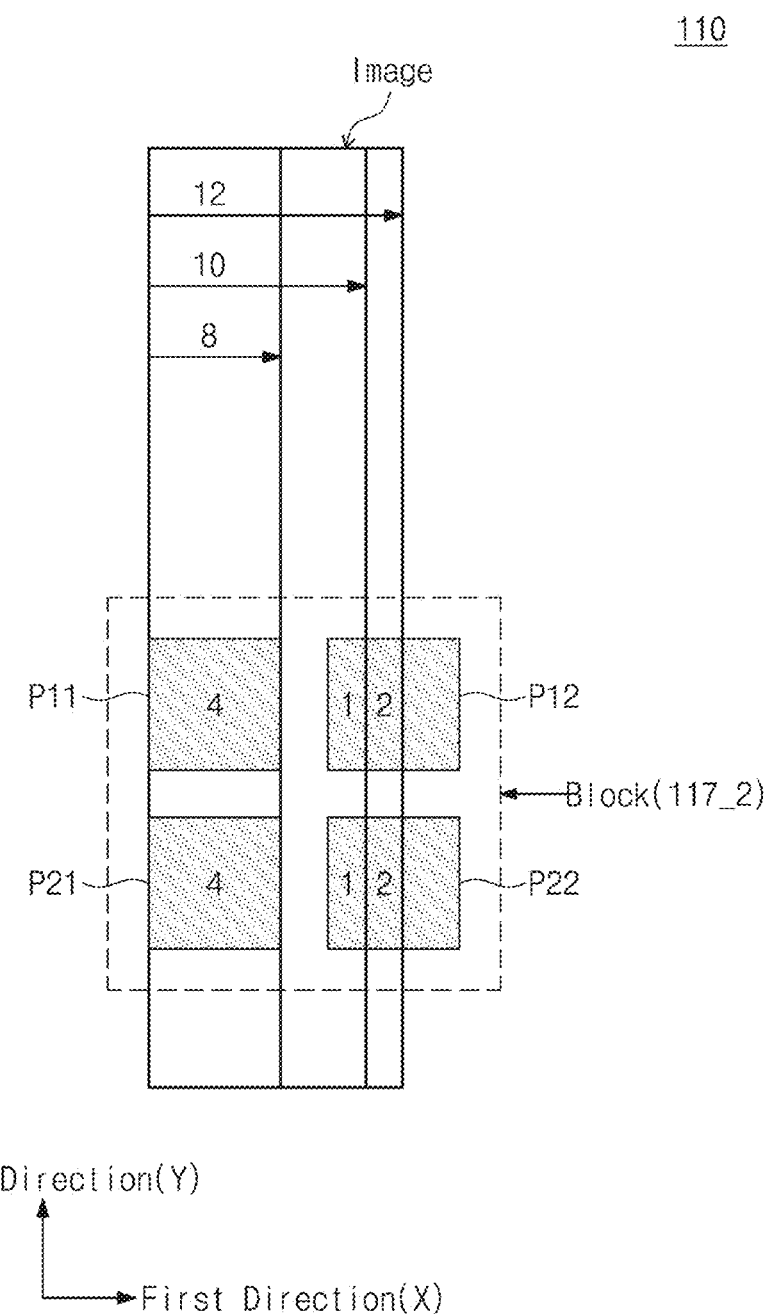
FIG. 14 exemplarily shows edge blocks having the same amplitudes of the second direction signals.

In operation S146, the image signal processor 150 may determine that the direction line of the edge block is directed in the second direction. FIG. 14 exemplarily shows edge blocks having the same amplitudes of the second direction signals. The image may be formed along the second direction. The line width of the image may be varied, for example, 8, 10, 12, and the like, as shown in FIG. 14. Regardless of the line width of the image shown in FIG. 14, the amplitudes of the second direction signals output from the pixels P21 and P11 arranged along the second direction and converted by the converter 140 may be equal to each other as 4. If the line width of the image shown in FIG. 14 is 10, the amplitudes of the second direction signals output from the pixels P22 and P12 arranged along the second direction and converted by the converter 140 may be equal to each other as 1. Similarly, if the line width of the image shown in FIG. 14 is 12, the amplitudes of the second direction signals output from the pixels P22 and P12 arranged along the second direction and converted by the converter 140 may be equal to each other as 2. Accordingly, the image signal processor 150 may determine that the direction line of the edge block 117_2 is directed in the second direction.

In the embodiment, the order of operations S141, S143, and S145 is not limited to that shown in FIG. 10.

Referring to FIGS. 10 to 14, the order in which the image signal processor 150 determines whether the direction line of the edge block is directed to the first direction or the second direction (i.e., whether the direction line is the horizontal direction or the vertical direction) is described. Referring to FIGS. 15 to 21, operations of the image signal processor 150 to determine the direction in which the direction line is directed in the direction other than the first direction and the second direction will be described.

Figure 15:
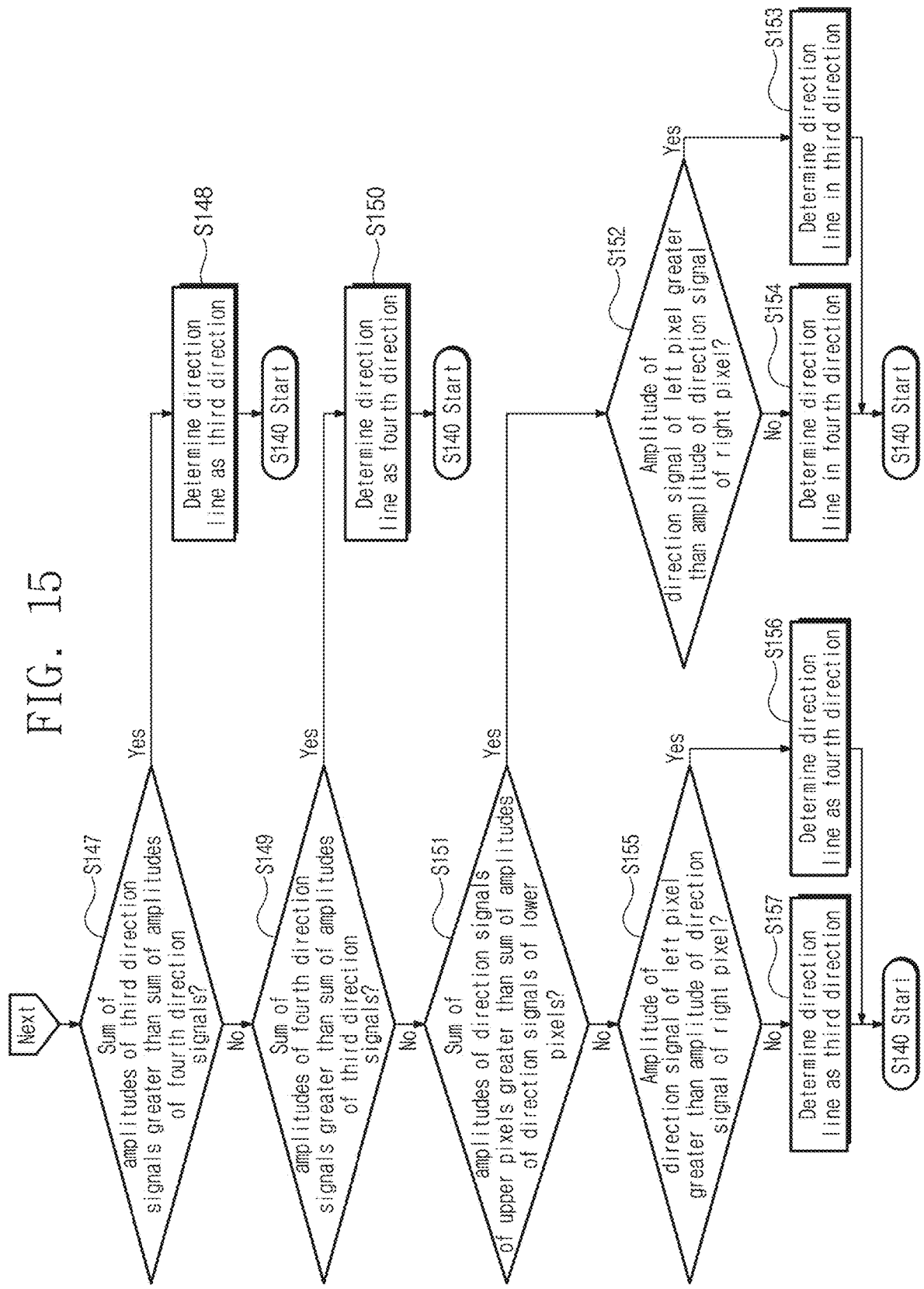
FIG. 15 is a flowchart illustrating an example of detailed operations of operation S140 of FIG. 3.

FIG. 15 is a flowchart illustrating an example of detailed operations of operation S140 of FIG. 3. FIG. 15 will be described with reference to FIGS. 1 to 3. FIG. 15 will be described together with reference to the specific examples shown in FIGS. 16 to 21. In FIG. 15, it is assumed that each of the blocks partitioning the pixel array 110 includes 2×2 pixels P11, P12, P21, and P22. Then, the X-axis direction is the first direction and the Y-axis direction is the second direction. It is assumed that the amplitude of the digital signal converted by the converter 140 from one pixel in FIGS. 15 to 21 is 0 to 4.

The direction line of the edge block may not be determined through operations S141 to S146 of FIG. 10. In this case, the direction line of the edge block may be directed in a direction other than the first direction or the second direction. The other direction may be, for example, a third direction or a fourth direction. The angle between the third direction and the first direction may be 45°. The angle between the fourth direction and the first direction may be 135°. In an embodiment, the image signal processor 150 may further determine other directions having different angles as well as the first to fourth directions.

In operation S147, the image signal processor 150 may determine whether the sum of the amplitudes of the third direction signals is greater than the sum of the amplitudes of the fourth direction signals. The converter 140 may convert the image signals output from the pixels P21 and P12 arranged in the third direction into the third direction signals. The converter 140 may convert the image signals output from the pixels P22 and P11 arranged in the fourth direction into the fourth direction signals. The image signal processor 150 may perform an operation based on Equation 7.

$$(|P21|=|P23|)>(|P22|=|P11|) \qquad \text{[Equation 7]}$$

For example, the image signal processor 150 may include at least one register that stores each of the amplitudes of the third direction signals and the fourth direction signals. If the sum of the amplitudes of the third direction signals is greater than the sum of the amplitudes of the fourth direction signals, operation S148 may be performed. If not, operation S149 may proceed.

Figure 16:
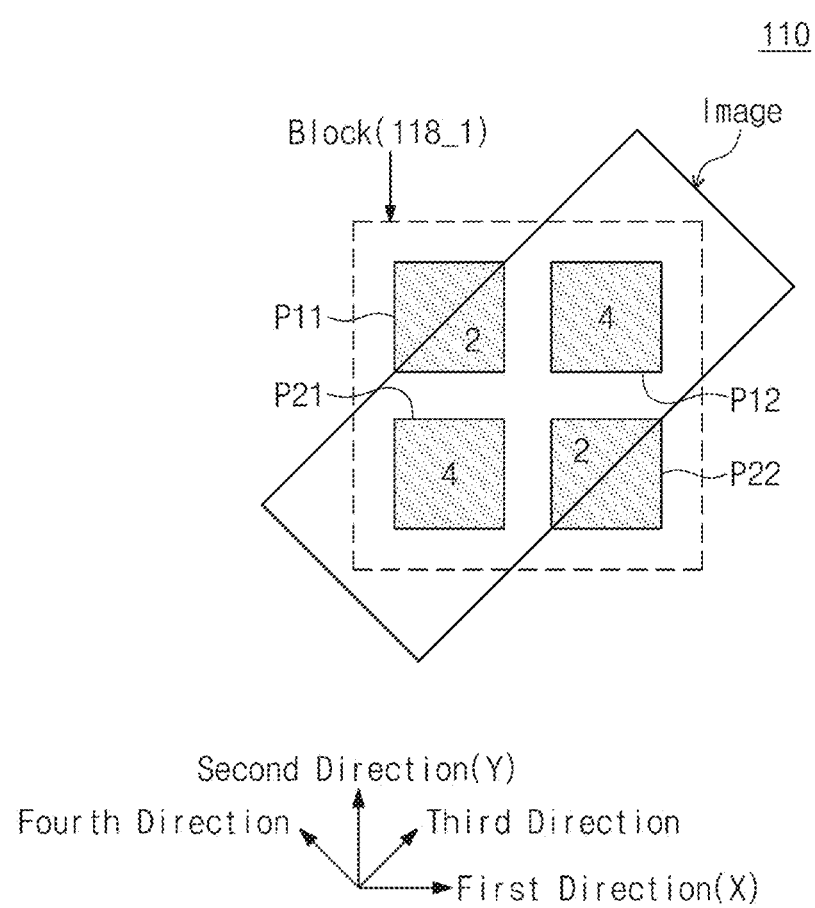
FIG. 16 exemplarily shows an edge block in which the sum of the amplitudes of the third direction signals is larger than the sum of the amplitudes of the fourth direction signals.

In operation S148, the image signal processor 150 may determine that the direction line of the edge block is directed in the third direction. FIG. 16 exemplarily shows an edge block in which the sum of the amplitudes of the third direction signals is greater than the sum of the amplitudes of the fourth direction signals. The image may be formed along the third direction. The sum of the amplitudes of the third direction signals output from the pixels P21 and P12 arranged along the third direction and converted by the converter 140 may be 8. The sum of the amplitudes of the fourth direction signals output from the pixels P22 and P11 arranged along the fourth direction and converted by the converter 140 may be 4. Accordingly, the image signal processor 150 may determine that the direction line of the edge block 118_1 is directed in the third direction.

In operation S149, the image signal processor 150 may determine whether the sum of the amplitudes of the fourth direction signals is greater than the sum of the amplitudes of the third direction signals. The image signal processor 150 may perform an operation based on Equation 8.

$$(|P22|=|P11|)>(|P21|=|P12|) \qquad \text{[Equation 8]}$$

If the sum of the amplitudes of the fourth direction signals is greater than the sum of the amplitudes of the third direction signals, operation S150 may be performed. If not, operation S151 proceeds.

Figure 17:
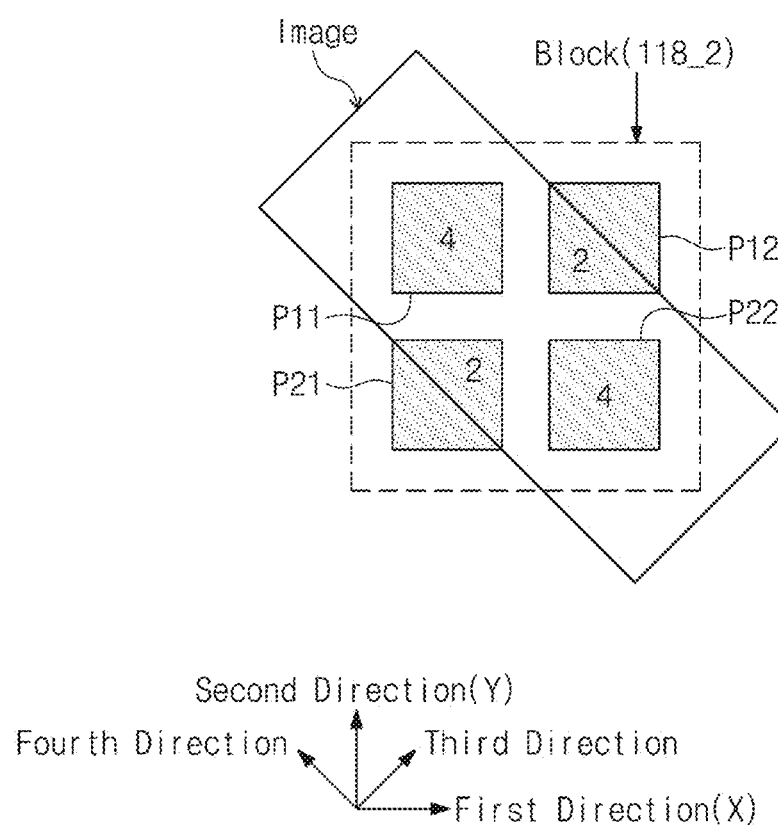
FIG. 17 exemplarily shows an edge block in which the sum of the amplitudes of the fourth direction signals is larger than the sum of the amplitudes of the third direction signals.

In operation S150, the image signal processor 150 may determine that the direction line of the edge block is directed in the fourth direction. FIG. 17 exemplarily shows an edge block in which the sum of the amplitudes of the fourth direction signals is greater than the sum of the amplitudes of the third direction signals. The image may be formed along the fourth direction. The sum of the amplitudes of the fourth direction signals output from the pixels P22 and P11 arranged along the fourth direction and converted by the converter 140 may be 8. The sum of the amplitudes of the third direction signals output from the pixels P21 and P12 arranged along the third direction and converted by the converter 140 may be 4. Accordingly, the image signal processor 150 may determine that the direction line of the edge block 118_2 is directed in the fourth direction.

In operation S151, the sum of the amplitudes of the third direction signals may be equal to the sum of the amplitudes of the fourth direction signals. The image signal processor 150 may determine whether the sum of the amplitudes of the direction signals of the upper pixels is greater than the sum of the amplitudes of the direction signals of the lower pixels.

The upper pixels may be disposed above the lower pixel along the second direction. The coordinate value in the second direction of the upper pixels may be greater than the coordinate value in the second direction of the lower pixels. The coordinate value on the first direction of the upper pixels may be the same as the coordinate value on the first direction of the lower pixels. For example, the upper pixels may be pixels P11 and P12 (e.g., may be referred to as first sub-pixels), and the lower pixels may be pixels P21 and P22 (e.g., referred to as second sub-pixels). The direction signals of the upper pixels are digital signals that are output from the upper pixels P11 and P12 and may be converted by the converter 140. The direction signals of the lower pixels are digital signals that are output from the lower pixels P21 and P22 and may be converted by the converter 140. The image signal processor 150 may perform an operation based on Equation 9.

$$(|P11|=|P12|)>(|P21|=|P22|) \qquad \text{[Equation 9]}$$

If the sum of the amplitudes of the direction signals of the upper pixels is greater than the sum of the amplitudes of the direction signals of the lower pixels, operation S152 may be performed. If not, operation S155 proceeds.

In operation S152, the image signal processor 150 may determine whether the amplitude of the direction signal of the left pixel is greater than the amplitude of the direction signal of the right pixel. The right pixel may be disposed on the right of the left pixel along the first direction. The coordinate value in the first direction of the right pixel may be greater than the coordinate value in the first direction of the left pixel. The coordinate value in the second direction of the right pixel may be the same as the coordinate value in the second direction of the left pixel. For example, the left pixel and the right pixel may be pixels P11 and P12 arranged along the first direction, respectively. Alternatively, the left pixel and the right pixel may be pixels P21 and P22 arranged along the first direction, respectively. The image signal processor 150 may perform an operation based on Equation 10.

$$(|P11|>|P12|) \cap (|P21|>|P22|) \qquad \text{[Equation 10]}$$

If the amplitude of the direction signal of the left pixel is greater than the amplitude of the direction signal of the right pixel, operation S153 may be performed. If not, operation S154 proceeds.

Figure 18:
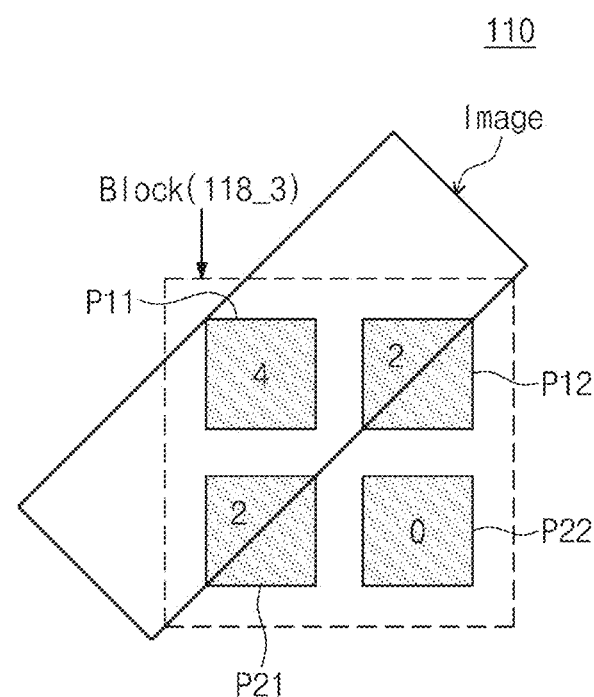
FIG. 18 exemplarily shows an edge block in which the sum of the amplitudes of the direction signals of the upper pixels is greater than the sum of the amplitudes of the direction signals of the lower pixels and the amplitude of the direction signal of the left pixel is larger than the amplitude of the direction signal of the right pixel.

In operation S153, the image signal processor 150 may determine that the direction line of the edge block is directed in the third direction. FIG. 18 exemplarily shows an edge block in which the sum of the amplitudes of the direction signals of the upper pixels is greater than the sum of the amplitudes of the direction signals of the lower pixels and the amplitude of the direction signal of the left pixel is greater than the amplitude of the direction signal of the right pixel. The image may be formed along the third direction. However, the image of FIG. 18 may be located above the image of FIG. 16 with respect to the second direction.

Referring to FIG. 18, the sum of the amplitudes of the direction signals of the upper pixels P11 and P12 may be 6. The sum of the amplitudes of the direction signals of the lower pixels P21 and P22 may be 2. The amplitude of the direction signal of the left pixel P11 may be 4. The amplitude of the direction signal of the right pixel P12 may be 2. The amplitude of the direction signal of the left pixel P21 may be 2. The amplitude of the direction signal of the right pixel P22 may be 0. Accordingly, the image signal processor 150 may determine that the direction line of the edge block 118_3 is directed in the third direction.

In operation S154, the image signal processor 150 may determine that the direction line of the edge block is directed in the fourth direction. FIG. 19 exemplarily shows an edge block in which the sum of the amplitudes of the direction signals of the upper pixels is greater than the sum of the amplitudes of the direction signals of the lower pixels and the amplitude of the direction signal of the right pixel is greater than the amplitude of the direction signal of the left pixel. The image may be formed along the fourth direction. However, the image of FIG. 19 may be located above the image of FIG. 17 based on the second direction.

Referring to FIG. 19, the sum of the amplitudes of the direction signals of the upper pixels P11 and P12 may be 6. The sum of the amplitudes of the direction signals of the lower pixels P21 and P22 may be 2. The amplitude of the direction signal of the left pixel P11 may be 2. The amplitude of the direction signal of the right pixel P12 may be 4. The amplitude of the direction signal of the left pixel P21 may be 0. The amplitude of the direction signal of the right pixel P22 may be 2. Accordingly, the image signal processor 150 may determine that the direction line of the edge block 118_4 is directed in the fourth direction.

In operation S155, the image signal processor 150 may determine whether the amplitude of the direction signal of the left pixel is greater than the amplitude of the direction signal of the right pixel. Operation S155 may be the same as operation S152. If the amplitude of the direction signal of the left pixel is greater than the amplitude of the direction signal of the right pixel, operation S156 may be performed. If not, operation S157 proceeds.

Figure 20:
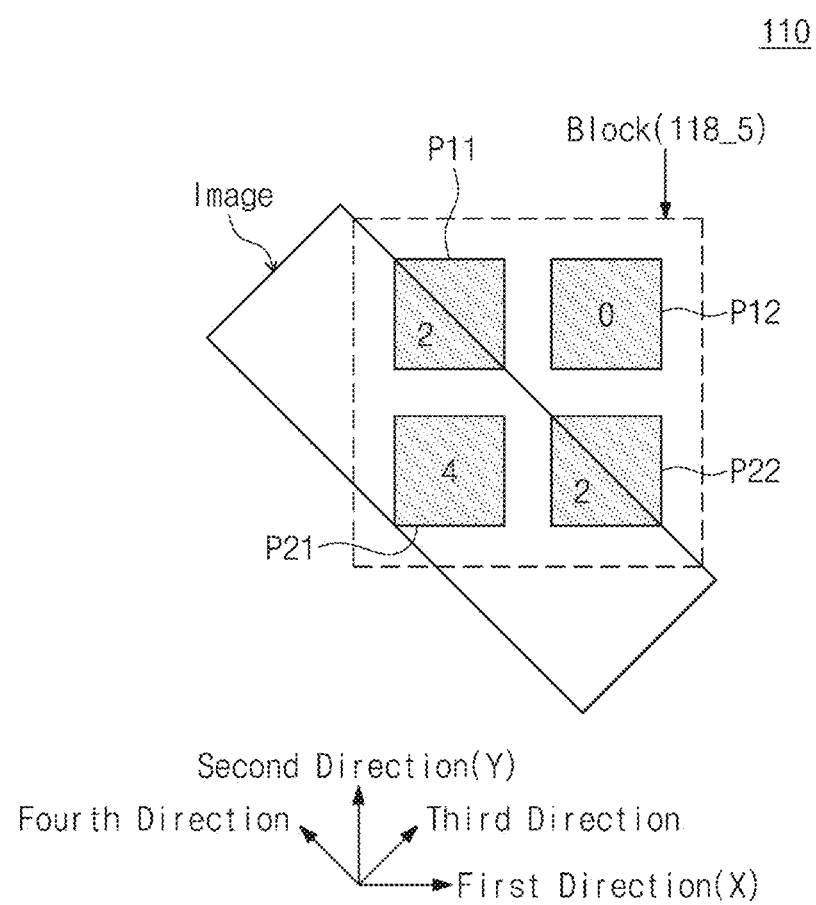
FIG. 20 exemplarily shows an edge block in which the sum of the amplitudes of the direction signals of the lower pixels is greater than the sum of the amplitudes of the direction signals of the upper pixels and the amplitude of the direction signal of the left pixel is larger than the amplitude of the direction signal of the right pixel.

In operation S156, the image signal processor 150 may determine that the direction line of the edge block is directed in the third direction. FIG. 20 exemplarily shows an edge block in which the sum of the amplitudes of the direction signals of the lower pixels is greater than the sum of the amplitudes of the direction signals of the upper pixels and the amplitude of the direction signal of the left pixel is greater than the amplitude of the direction signal of the right pixel. The image may be formed along the fourth direction. However, the image of FIG. 20 may be located further below the image of FIG. 17 based on the second direction.

Referring to FIG. 20, the sum of the amplitudes of the direction signals of the upper pixels P11 and P12 may be 2. The sum of the amplitudes of the direction signals of the lower pixels P21 and P22 may be 6. The amplitude of the direction signal of the left pixel P11 may be 2. The amplitude of the direction signal of the right pixel P12 may be 0. The amplitude of the direction signal of the left pixel P21 may be 4. The amplitude of the direction signal of the right pixel P22 may be 2. Accordingly, the image signal processor 150 may determine that the direction line of the edge block 118_5 is directed in the fourth direction.

Figure 21:
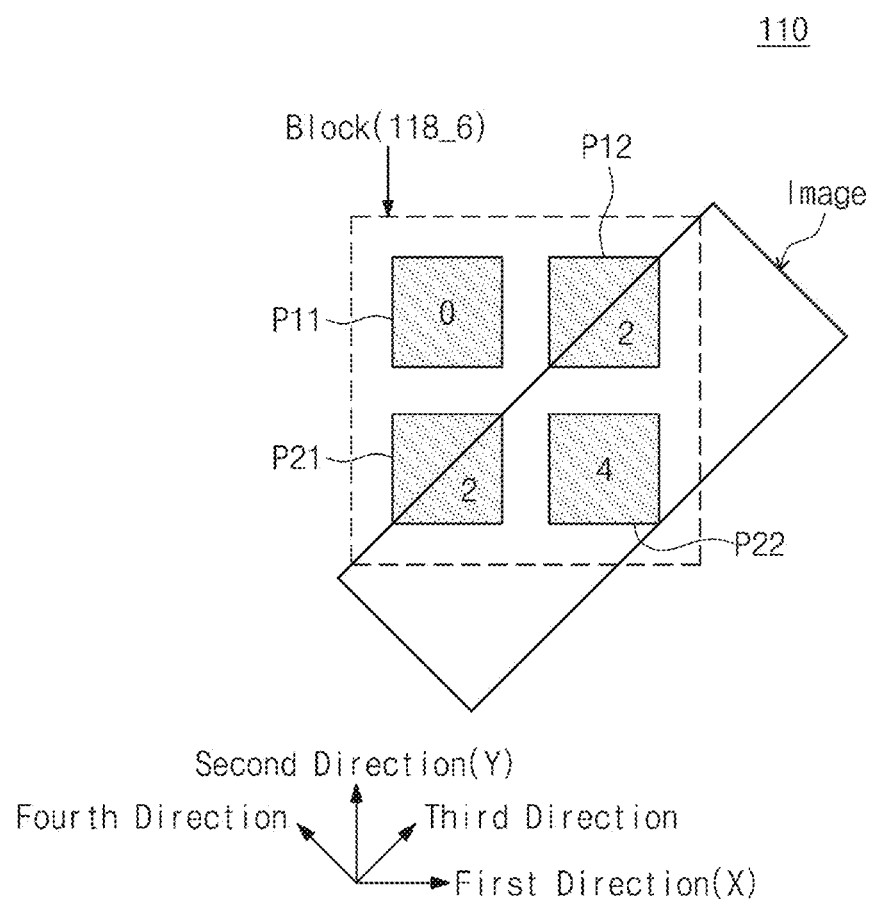
FIG. 21 exemplarily shows an edge block in which the sum of the amplitudes of the direction signals of the lower pixels is greater than the sum of the amplitudes of the direction signals of the upper pixels and the amplitude of the direction signal of the right pixel is larger than the amplitude of the direction signal of the left pixel.

In operation S157, the image signal processor 150 may determine that the direction line of the edge block is directed in the third direction. FIG. 21 exemplarily shows an edge block in which the sum of the amplitudes of the direction signals of the lower pixels is greater than the sum of the amplitudes of the direction signals of the upper pixels and the amplitude of the direction signal of the right pixel is greater than the amplitude of the direction signal of the left pixel. The image may be formed along the third direction. However, the image of FIG. 21 may be located further below the image of FIG. 16 based on the second direction.

Referring to FIG. 21, the sum of the amplitudes of the direction signals of the upper pixels P11 and P12 may be 2. The sum of the amplitudes of the direction signals of the lower pixels P21 and P22 may be 6. The amplitude of the direction signal of the left pixel P11 may be 0. The amplitude of the direction signal of the right pixel P12 may be 2. The amplitude of the direction signal of the left pixel P21 may be 2. The amplitude of the direction signal of the right pixel P22 may be 4. Accordingly, the image signal processor 150 may determine that the direction line of the edge block 118_6 is directed in the third direction.

The image signal processor 150 according to the embodiment of the inventive concept may determine the direction lines of the blocks 118_1 and 118_2 when the image is located at the center in the blocks 118_1 and 118_2 in FIGS. 16 and 17. Also, even if the image is not located at the center in the blocks 118_3 to 118_6 in FIGS. 18 and 21, the image signal processor 150 may determine the direction lines of the blocks 118_3 to 118_6, respectively. The image signal processor 150 may place the direction line at the center of the block, regardless of whether the image is located at the center in the block.

Figure 22:
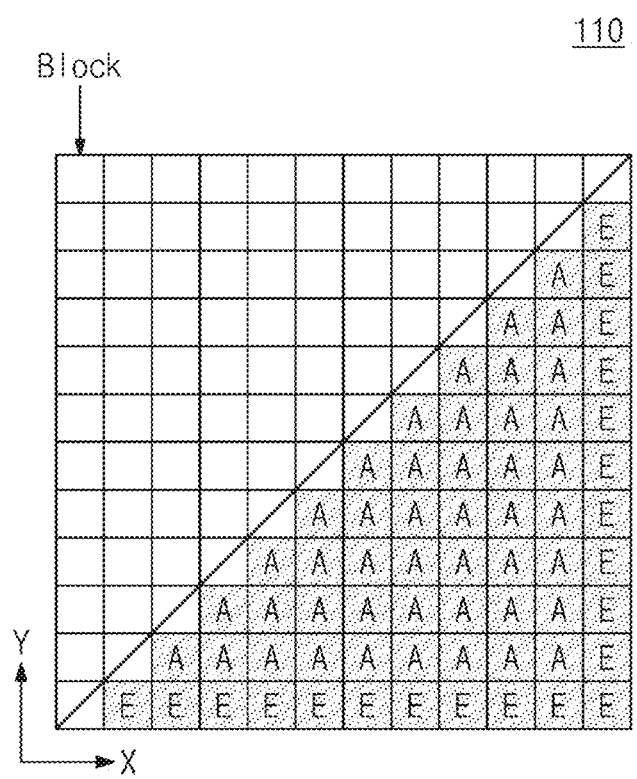
FIGS. 22 and 23 illustrate an example in which an edge of an image is extracted according to an embodiment of the inventive concept.
Figure 23:
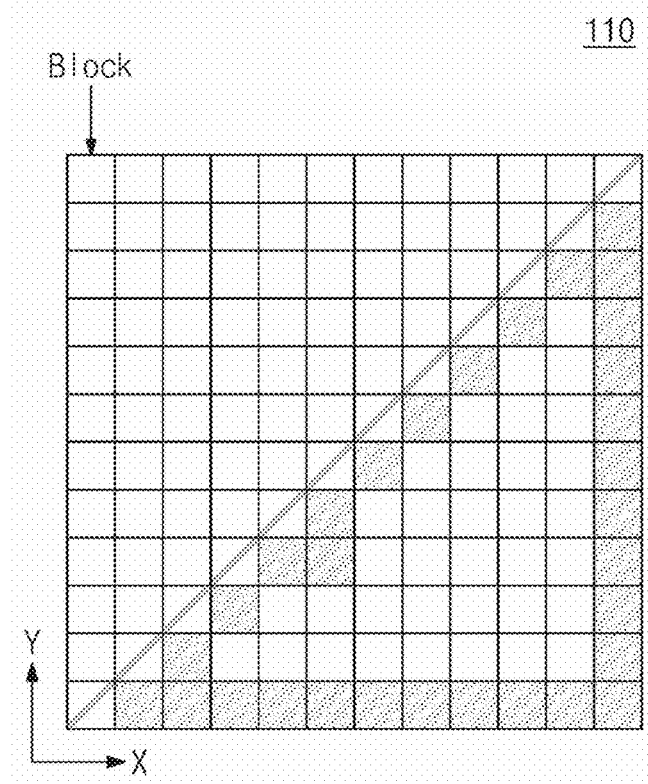

FIGS. 22 and 23 illustrate an example in which an edge of an image is extracted according to an embodiment of the inventive concept. For example, optical signals based on an image of a triangular shape may be incident on the pixel array 110.

Referring to FIG. 22, pixels of the pixel array 110 may generate image signals based on the triangular shaped image. The converter 140 may convert these image signals into digital signals. The sum of the amplitudes of the digital signals of each of the blocks corresponding to the outside of the image of the triangular shape may be less than the first reference value. The sum of the amplitudes of the digital signals of each of the blocks corresponding to the edges of the triangular shaped image may be greater than or equal to a first reference value and may be less than the second reference value. The sum of the amplitudes of the digital signals of each of the blocks corresponding to the inside of the image of the triangular shape may be greater than or equal to the second reference value. The image signal processor 150 may classify blocks that partition the pixel array 110 into a block having no direction line, an edge block E having a direction line, and a block A having a direction line that may be directed in all directions based on operation S130 of FIG. 3 including operations S131 to S135 of FIG. 4 Then, the image signal processor 150 may determine the direction of the direction line of the edge block E based on operation S140 of FIG. 3 including operations S141 to S146 of FIG. 10 and operations S147 to S157 of FIG. 15.

FIG. 23 exemplarily shows the edge of the triangular-shaped image extracted according to operations S130 and S140 in FIG. 3. If the adjacent blocks of a block A may have directional lines that may be directed in all directions of A (i.e., if the sum of the amplitudes of the digital signals of the adjacent blocks is greater than or equal to the second reference value), the image signal processor 150 may determine that the block A does not have a direction line corresponding to an edge of the image.

Figure 24:
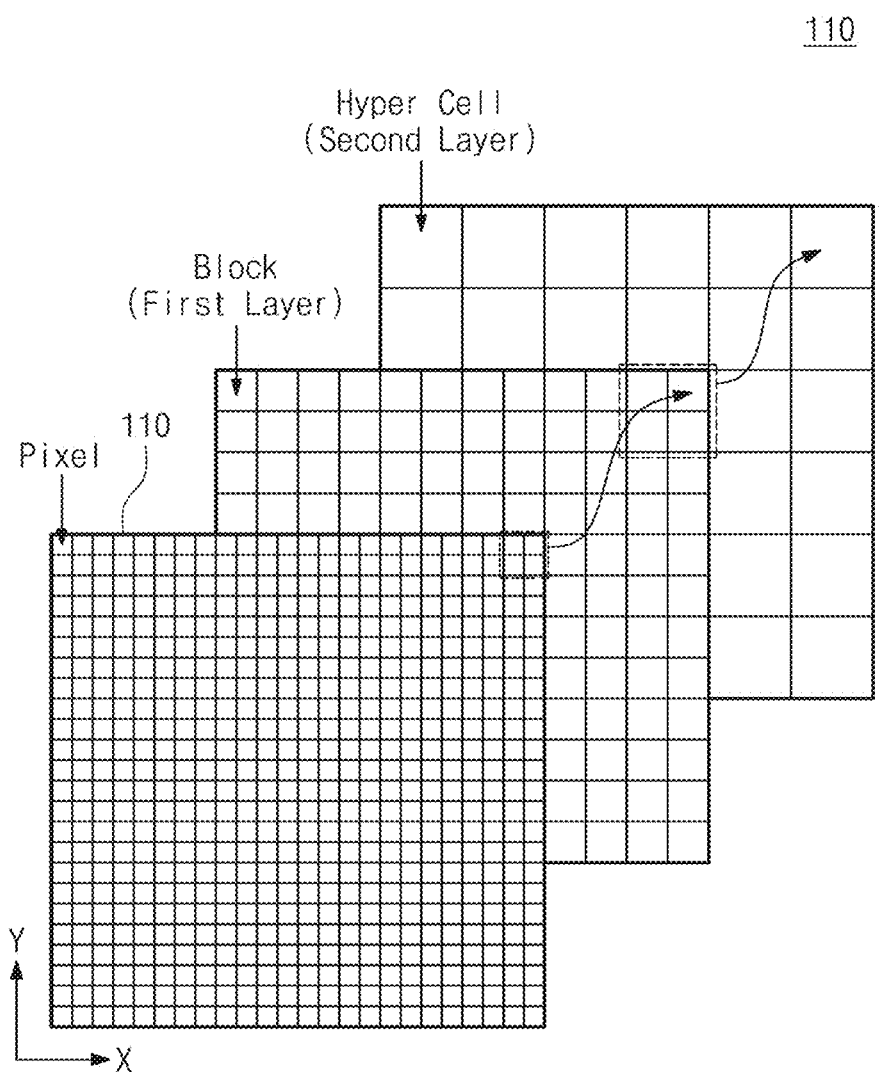
FIG. 24 exemplarily illustrates a process of hierarchically extracting edges of an image according to another embodiment of the inventive concept.

FIG. 24 exemplarily illustrates a process of hierarchically extracting edges of an image according to another embodiment of the inventive concept. FIG. 24 will be described with reference to FIGS. 1 and 3.

As described above, the pixel array 110 of FIG. 1 may include pixels arranged along the X and Y axes. Referring to FIG. 24, in the first layer, the pixel array 110 may be partitioned into blocks each including 2×2 pixels. Also, in the second layer, the pixel array 110 may be partitioned into hyper cells (HCs) each including 2×2 blocks. Here, the size of the block and the size of the hyper cell are not limited to the above-described values, and may be determined based on the user's request, image resolution, edge precision, edge extraction speed, and the like.

The direction lines of the blocks of the hyper cell may be determined by the image signal processor 150 based on operation S130 of FIG. 3 including operations S131 to S135 of FIG. 4, and operation S140 of FIG. 3 including operations S141 to S146 of FIG. 10 and operations S147 to S157 of FIG. 15. The image signal processor 150 may include at least one counter configured to count the directions of the direction lines of the blocks of the hyper cell. The image signal processor 150 may determine the direction in which the direction line of the hyper cell is directed based on the counting result. The image signal processor 150 may determine the direction in which the direction line of the hyper cell is directed based on a majority operation.

For example, if the direction lines of the blocks of the hyper cell are 0°, 0°, 0°, and 90°, respectively, the image signal processor 150 may select the direction line of the hyper cell as 0°. If the direction lines of the blocks of the hyper cell are 0°, 45°, 90°, and 135°, respectively (i.e., when the frequency numbers indicating the first to fourth directions are the same), the image signal processor 150 may determine that there is no direction line of the hyper cell.

In an embodiment, the hyper cells shown in FIG. 24 may be the first hyper cells, and the pixel array 110 may be partitioned into second hyper cells (not shown), each of which includes at least four first hyper cells, in a third layer (not shown). The image signal processor 150 may determine the direction in which the direction line of the second hyper cell is directed in a manner similar to that of the first hyper cell. As the layer in which the pixel array 110 is partitioned increases, the edge precision may be reduced, but the edge extraction speed may increase.

Figure 25:
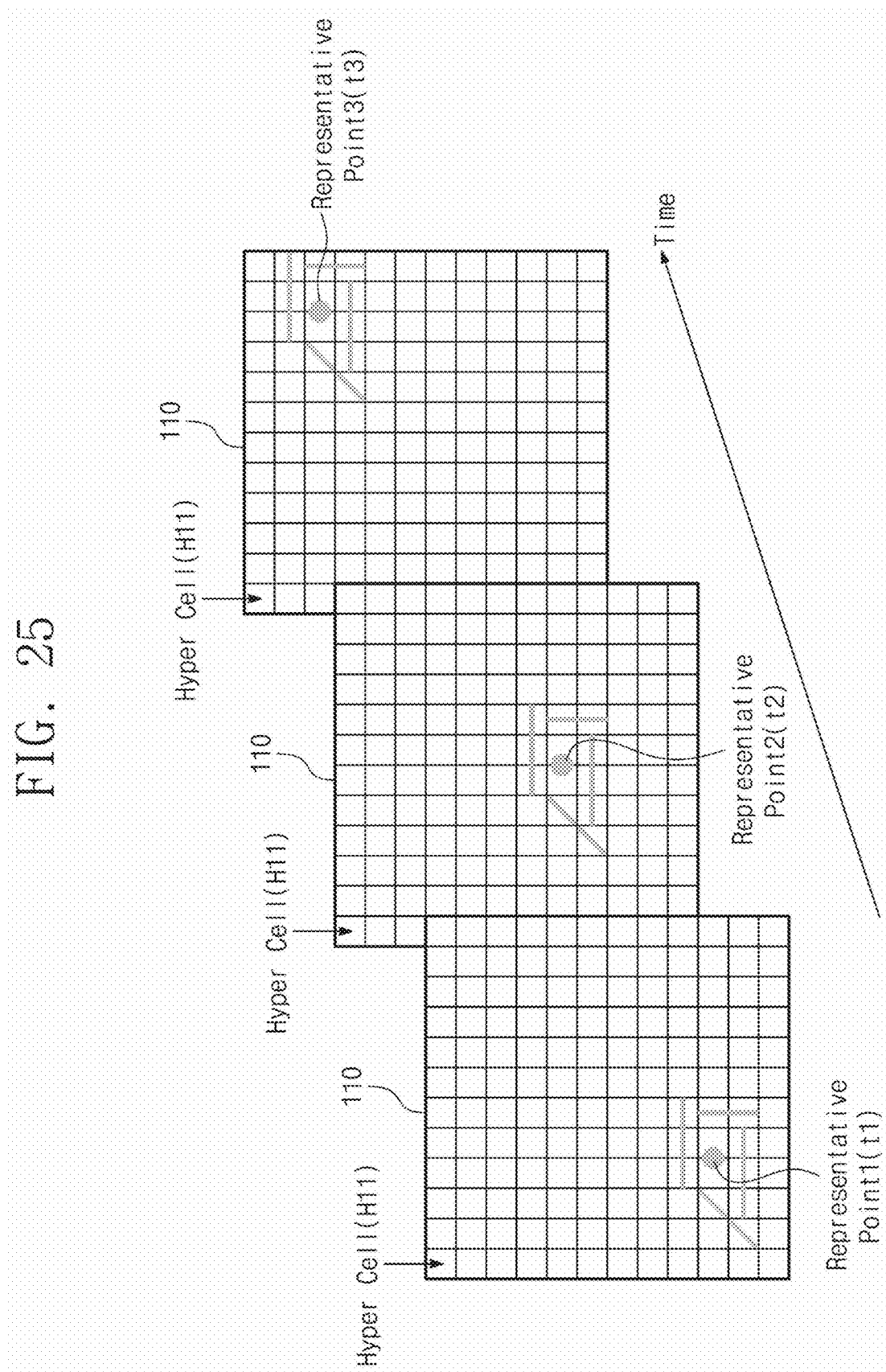
FIGS. 25 and 26 illustrate a process of extracting a motion of an image according to another embodiment of the inventive concept.
Figure 26:
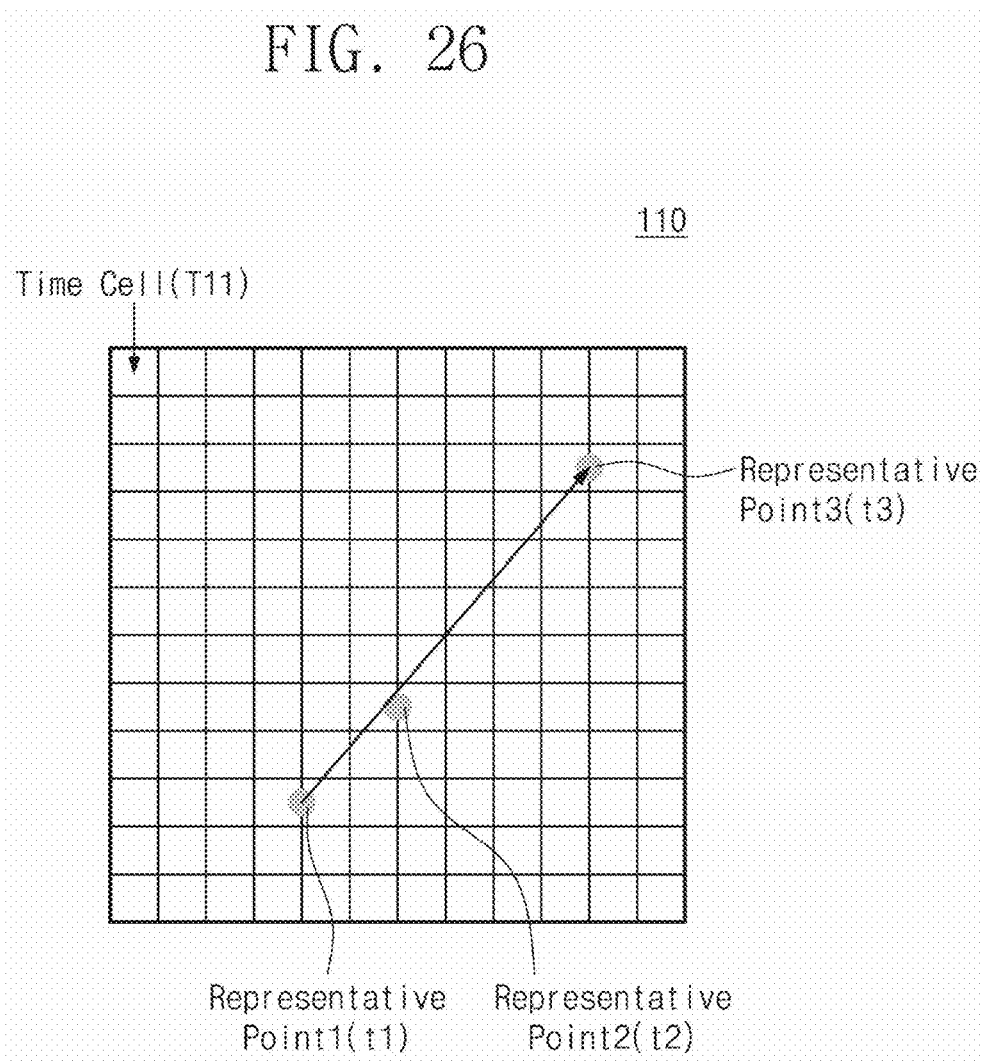

FIGS. 25 and 26 illustrate a process of extracting a motion of an image according to another embodiment of the inventive concept. FIGS. 25 and 26 will be described together and will be described with reference to FIGS. 1 and 3. In FIG. 25, the pixel array 110 may be partitioned into hyper cells of an arbitrary size.

The image signal processor 150 may extract the edges of the image at the time points t1, t2, and t3, respectively, based on operation S130 of FIG. 3 including operations S131 to S135 of FIG. 4, operation S140 of FIG. 3 including operations S141 to S146 of FIG. 10 and operations S147 to S157 of FIG. 15, and the direction line determination method of the hyper cell described above with reference to FIG. 25. The image signal processor 150 may compare the image edges of the time points t1, t2, and t3 and may determine the motion of the image over time. The edges of the image extracted at the time points t1, t2, and t3 by the image signal processor 150 are shown in FIG. 25. The image signal processor 150 may detect the centers of the edges of the image as representative points t1, t2, and t3 at the time points t1, t2, and t3.

In FIG. 26, the pixel array 110 may be partitioned into time cells (TC) having the same physical size as the hyper cell of FIG. 25. A time cell has physically the same size as a hyper cell, but may represent hyper cells at different time points. For example, the time cell T11 may represent a hyper cell H11 of a time point t1, a hyper cell H11 of a time point t2, and a hyper cell H11 of a time point t3. The image signal processor 150 stores the information (e.g., the addresses of the hyper cell, block, and pixel where the representative point is located) on the representative points t1, t2, and t3 in FIG. 25 and writes it in time cells. The image signal processor 150 may determine the motion of the image by connecting the representative points t1, t2, and t3 of FIG. 25 in the time cells.

Figure 27:
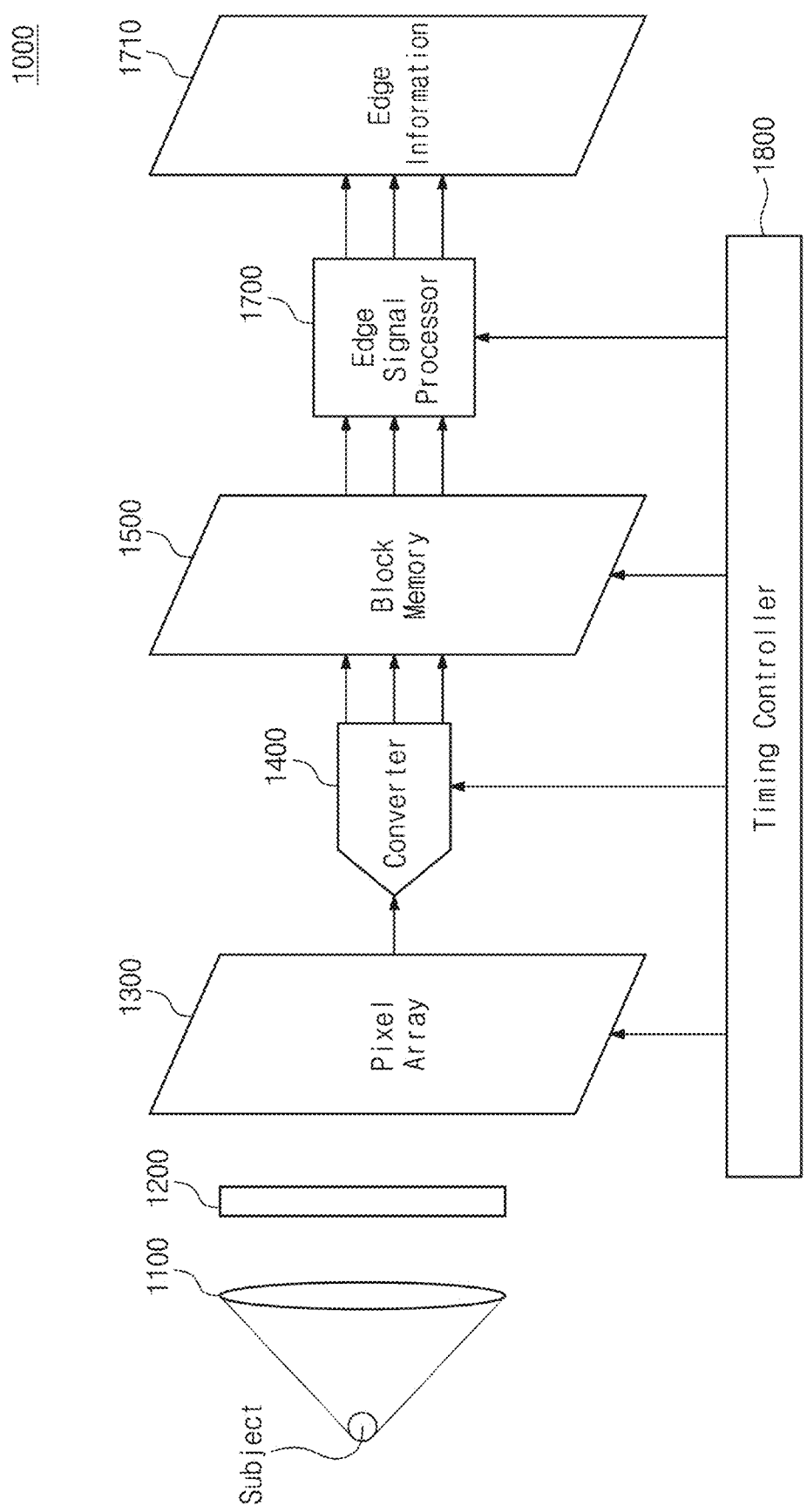
FIG. 27 is a block diagram exemplarily illustrating an image sensor according to another embodiment of the inventive concept.

FIG. 27 is a block diagram exemplarily illustrating an image sensor according to another embodiment of the inventive concept. The image sensor 1000 may include a lens 1100, a filter 1200, a pixel array 1300, a converter 1400, a block memory 1500, an edge signal processor 1700, and a timing controller 1800.

The lens 1100 may collect the optical signals reflected from the subject, and the filter 1200 may filter the optical signals incident through the lens 1100. The filtered optical signals may be provided to the pixel array 1300. The pixel array 1300, the converter 1400, and the timing controller 1800 may be similar to the pixel array 110, the converter 140, and the timing controller 160 described above with reference to FIG. 1.

The block memory 1500 may store the amplitudes of the digital signals of each of the blocks converted by the converter 1400 and the sum thereof. The amplitudes of the digital signals stored in the block memory 1500 may configure an edge map of the image. The block memory 1500 may further store the address information of the pixel array and the address information of the blocks. The address information of the blocks stored in the block memory 1500 may be changed by the edge signal processor 1700.

The edge signal processor 1700 may be the image signal processor 150 described above with reference to FIG. 1. The edge signal processor 1700 may extract edge information 1710 based on the digital signals of each of the blocks stored in the block memory 1500. The edge signal processor 1700 may store the edge information 1710 in the block memory 1500.

Figure 28:
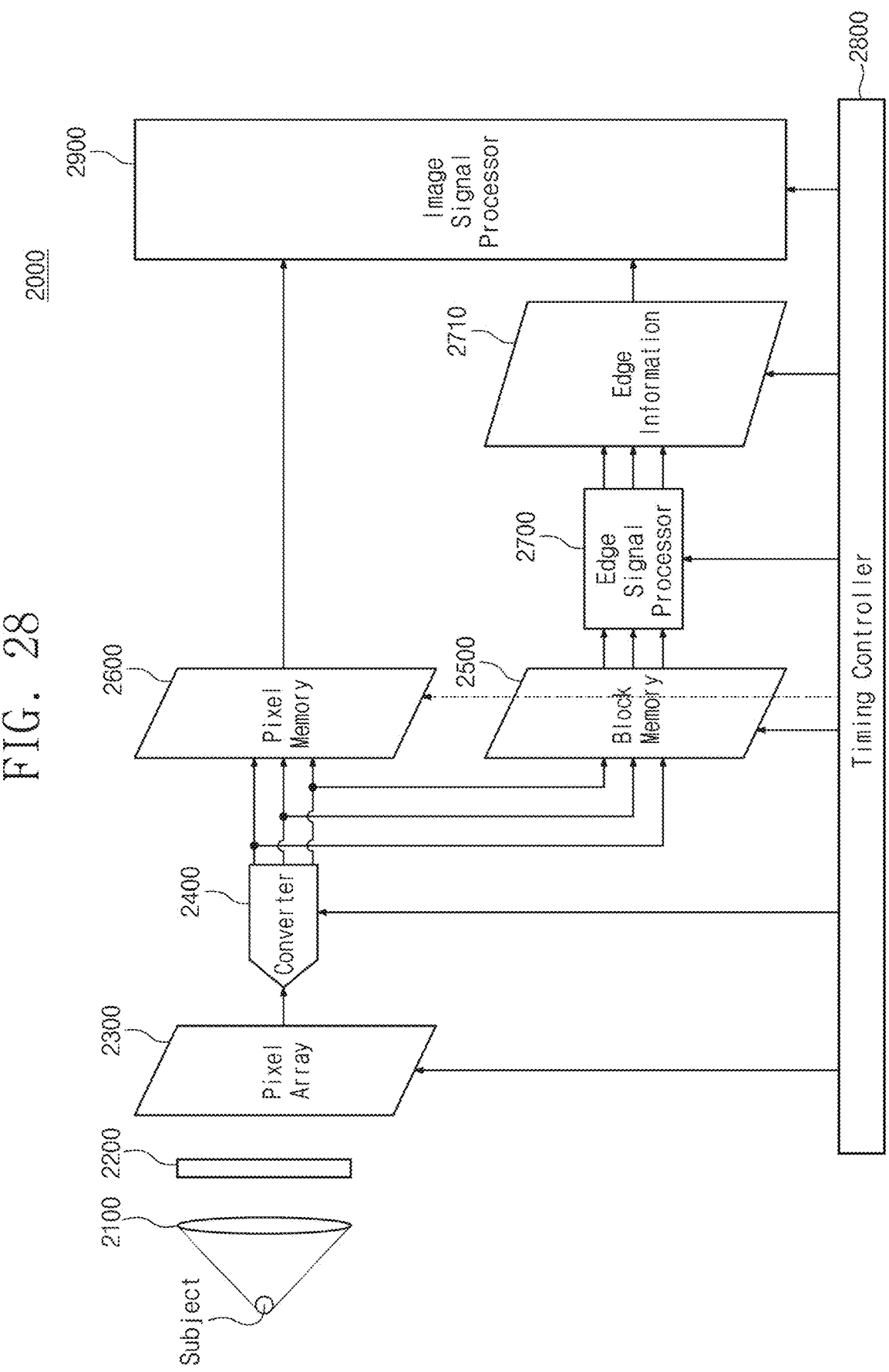
FIG. 28 is a block diagram exemplarily illustrating an image sensor according to another embodiment of the inventive concept.

FIG. 28 is a block diagram exemplarily illustrating an image sensor according to another embodiment of the inventive concept. The image sensor 2000 includes a lens 2100, a filter 2200, a pixel array 2300, a converter 2400, a block memory 2500, a pixel memory 2600, an edge signal processor 2700, a timing controller 2800, and an image signal processor 2900. The lens 2100, the filter 2200, the pixel array 2300, the converter 2400, the block memory 2500, the edge signal processor 2700, and the timing controller 2800 may be similar to the lens 1100, the filter 1200, the pixel array 1300, the converter 1400, the block memory 1500, the edge signal processor 1700, and the timing controller 1800, respectively. Compared to the image sensor 1000 of FIG. 27, the image sensor 2000 may further include a pixel memory 2600 and an image signal processor 2900.

The pixel memory 2600 may store the amplitude of the digital signal of the pixel that is converted by the converter 1400. In other words, the pixel memory 2600 may store information of an image in pixel units, and the block memory 2500 may store information of an image in block units. Although not shown in FIG. 28, the image sensor 2000 may further include another memory for storing information of an image in hyper cell units or time cell units.

According to an embodiment of the invention, the image signal processor 2900 may receive both pixel-by-pixel image information from the pixel memory 2600 and edge information of the image from the edge signal processor 2700. The image signal processor 2900 may use the edge information of the image to process the image.

According to the embodiment of the inventive concept, the amplitudes of the signals output from the pixels may be compared and the edge information of the image may be extracted. The image sensor according to the embodiment of the inventive concept may extract the edge information of the image at a high speed and the power consumption of the image sensor required for the extraction may be reduced.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. An image sensor comprising:
   a pixel array comprising pixels arranged along a first direction and a second direction, the pixel array being partitioned into blocks;
   a converter configured to convert image signals output from the pixels into digital signals based on an image; and
   an image signal processor configured to determine edge blocks among the blocks by adding amplitudes of the digital signals belonging to each of the blocks, determine directions in which direction lines of the edge blocks are directed by comparing the amplitudes of the digital signals, and extract an edge of the image by connecting the direction lines, wherein a first block is one of the blocks, wherein the converter is further configured to convert image signals output from the first block into first digital signals, wherein the image signal processor is further configured to determine the first block as one of the edge blocks when a sum of amplitudes of the first digital signals is greater than or equal to a first reference value and is less than a second reference value, and wherein the first reference value and the second reference value are less than a maximum value of the sum of the amplitudes of the first digital signals.

2. The image sensor of claim 1, wherein when the sum of the amplitudes of the first digital signals is less than the first reference value, the image signal processor is further configured not to determine a direction line of the first block.

3. The image sensor of claim 1, wherein a second block is one of the blocks and is disposed adjacent to the first block, wherein the converter is further configured to convert image signals output from the second block into second digital signals, wherein a sum of amplitudes of the second digital signals is greater than or equal to the first reference value and is less than the second reference value, and wherein when the sum of the amplitudes of the first digital signals is greater than or equal to the second reference value, the image signal processor is further configured to determine a direction in which a direction line of the first block is directed based on a direction line of the second block.

4. The image sensor of claim 1, wherein the second blocks are part of the blocks and are disposed adjacent to the first block, wherein the first block is surrounded by the second blocks, wherein the converter is further configured to convert the image signals output from each of the second blocks into second digital signals, wherein a sum of amplitudes of the second digital signals is greater than or equal to the second reference value, and wherein when the sum of the amplitudes of the first digital signals is greater than or equal to the second reference value, the image signal processor is further configured not to determine a direction in which a direction line of the first block is directed.

5. The image sensor of claim 1, wherein the sum of the amplitudes of the first digital signals is greater than or equal to the first reference value and is less than the second reference value, wherein the first block comprises first pixels arranged along the first direction and included in the pixel array and second pixels arranged along the second direction and included in the pixel array, wherein the converter is further configured to convert image signals output from the first pixels into first direction signals and convert image signals output from the second pixels into second direction signals, and wherein the image signal processor is further configured to:

when amplitudes of the first direction signals of the first digital signals are equal to each other, determine that a direction line of the first block is directed in the first direction, and when amplitudes of the second direction signals of the first digital signals are equal to each other, determine that a direction line of the first block is directed in the second direction.

6. The image sensor of claim 5, wherein a second block is one of the blocks and is disposed adjacent to the first block, wherein the converter is further configured to convert image signals output from the second block into second digital signals, wherein a sum of amplitudes of the second digital signals is greater than or equal to the first reference value and is less than the second reference value, and wherein when the amplitudes of the first direction signals and the amplitudes of the second direction signals are equal to each other, the image signal processor is further configured to determine a direction in which the direction line of the first block is directed based on a direction line of the second block.

7. The image sensor of claim 5, wherein the first block further comprises third pixels arranged along the third direction and included in the pixel array and fourth pixels arranged along the fourth direction and included in the pixel array, wherein the converter is further configured to convert image signals output from the third pixels into third direction signals and convert image signals output from the fourth pixels into fourth direction signals, and wherein the image signal processor is further configured to:

when the amplitudes of the first direction signals are not equal to each other and the amplitudes of the second direction signals are not equal to each other, determine that the direction line of the first block is directed in the third direction or the fourth direction by comparing a sum of amplitudes of the third direction signals with a sum of amplitudes of the fourth direction signals.

8. The image sensor of claim 7, wherein the first pixels comprise first sub-pixels having a first coordinate value in the second direction and second sub-pixels having a second coordinate value in the second direction, wherein the converter is further configured to convert image signals output from the first sub-pixels into first sub-direction signals and convert image signals output from the second sub-pixels into second sub-direction signals, and wherein when the sum of the amplitudes of the third direction signals is equal to the sum of the amplitudes of the fourth direction signals, the image signal processor is further configured to compare a sum of amplitudes of the first sub-direction signals with a sum of amplitudes of the second sub-direction signals, compare the amplitudes of the first sub-direction signals, compare the amplitudes of the second sub-direction signals, and determine that the direction line of the first block is directed in the third direction or the fourth direction.

9. The image sensor of claim 1, wherein the pixel array is further partitioned into hyper cells, and wherein the image signal processor is further configured to determine directions in which direction lines of edge blocks of each of the hyper cells are directed, count directions of the edge blocks of each of the hyper cells, and determine a direction in which the direction lines of the hyper cells are directed based on a counting result.

10. The image sensor of claim 1, wherein the digital signals are the first digital signals, the edge blocks are first edge blocks, the direction lines are first direction lines, and the edge is a first edge, and wherein the image signal processor is further configured to determine second edge blocks among the blocks by adding amplitudes of the second digital signals belonging to each of the blocks, determine directions in which second direction lines of the second edge blocks are directed by comparing the amplitudes of the second digital signals, extract a second edge of the image by connecting the second direction lines, and determine a motion of the image over time by comparing the first edge with the second edge.

11. The image sensor of claim 1, further comprising a memory configured to store address information of the pixel array for the blocks, amplitudes of the digital signals, and a sum of the amplitudes of the digital signals.

12. An operation method of an image sensor comprising a pixel array comprising pixels arranged along a first direction and a second direction, a converter configured to convert image signals output from the pixel array into digital signals based on an image, and a memory, the method comprising:

storing, by an image signal processor, addresses of blocks partitioning the pixel array in the memory;

determining, by the image signal processor, edge blocks among the blocks by adding amplitudes of the digital signals;

determining, by the image signal processor, directions in which direction lines of the edge blocks are directed, wherein the determining of the edge blocks comprises:

not determining direction lines of first blocks of the blocks in which a sum of the amplitudes of the digital signals is less than a first reference value;

determining directions in which direction lines of second blocks of the blocks in which the sum of the amplitudes of the digital signals is greater than or equal to the first reference value and is less than a second reference value are directed, wherein the second blocks are included in the edge blocks; and determining directions in which direction lines of third blocks of the blocks in which a sum of the amplitudes of the digital signals greater than or equal to the second reference value are directed, based on the direction lines of the second blocks.

13. The method of claim 12, wherein the pixel array comprises first pixels arranged along the first direction, second pixels arranged along the second direction, third pixels arranged along a third direction, and fourth pixels arranged along a fourth direction, wherein the first to fourth pixels belong to each of the second blocks, wherein the converter is configured to convert image signals output from the first pixels into first direction signals and convert image signals output from the second pixels into second direction signals, wherein the determining of the directions in which the direction lines of the second blocks are directed comprises:

determining that the direction lines of the second blocks are directed in the first direction when amplitudes of the first direction signals among the digital signals are equal to each other; and determining that the direction lines of the second blocks are directed in the second direction when amplitudes of the second direction signals of the digital signals are equal to each other.

14. The method of claim 13, wherein the converter is further configured to convert image signals output from the third pixels into third direction signals and convert image signals output from the fourth pixels into fourth direction signals, wherein the determining the directions in which the direction lines of the second blocks are directed further comprises:

when the amplitudes of the first direction signals are not equal to each other and the amplitudes of the second direction signals are not equal to each other, determining that the direction lines of the second blocks are directed in the third direction or the fourth direction by comparing a sum of amplitudes of the third direction signals with a sum of amplitudes of the fourth direction signals.

15. The method of claim 14, wherein the first pixels comprise first sub-pixels having a first coordinate value in the second direction and second sub-pixels having a second coordinate value in the second direction, wherein the converter is further configured to convert image signals output from the first sub-pixels into first sub-direction signals and convert image signals output from the second sub-pixels into second sub-direction signals, and wherein the determining of the directions in which the direction lines of the second blocks are directed further comprises:

when the sum of the amplitudes of the third direction signals and the sum of the amplitudes of the fourth direction signals are equal, comparing a sum of amplitudes of the first sub-direction signals with a sum of amplitudes of the second sub-direction signals, comparing the amplitudes of the first sub-direction signals, and comparing the amplitudes of the second sub-direction signals, and determining that the direction lines of the second blocks are directed in the third direction or the fourth direction.

16. The method of claim 12, wherein the determining of the directions in which the direction lines of the third blocks are directed comprises:

determining the second blocks to be adjacent to each of the third blocks.

17. The method of claim 12, wherein the pixel array is further partitioned into hyper cells, wherein each of the hyper cells comprises a portion of the blocks, wherein the method further comprises:

determining, by the image signal processor, directions in which direction lines of blocks of each of the hyper cells are directed, counting directions of the blocks of each of the hyper cells, and determining directions in which direction lines of the hyper cells are directed based on a counting result.

18. The method of claim 13, wherein the digital signals are first digital signals, the edge blocks are first edge blocks, the direction lines are first direction lines, and the edge is a first edge, wherein the method further comprises:

determining, by the image signal processor, second edge blocks among the blocks by adding amplitudes of second digital signals converted by the converter and belonging to each of the blocks;

determining, by the image signal processor, directions in which second direction lines of the second edge blocks are directed by comparing the amplitudes of the second digital signals;

extracting, by the image signal processor, a second edge of the image by connecting the second direction lines; and determining, by the image signal processor, a motion of the image over time by comparing the first edge with the second edge.

\* \* \* \* \*